(12) United States Patent
Otake et al.

(10) Patent No.: US 8,991,204 B2
(45) Date of Patent: Mar. 31, 2015

(54) REFRIGERATING APPARATUS

(75) Inventors: Masahisa Otake, Ora-gun (JP);
Hidetaka Sasaki, Ora-gun (JP); Setsu Hasegawa, Ora-gun (JP); Ken Kawakubo, Ora-gun (JP); Kazuhiko Mihara, Tatebayashi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 832 days.

(21) Appl. No.: 12/788,528

(22) Filed: May 27, 2010

(65) Prior Publication Data
US 2010/0300135 A1 Dec. 2, 2010

(30) Foreign Application Priority Data

May 27, 2009 (JP) .................. 2009-127393

(51) Int. Cl.
*F24D 17/02* (2006.01)
*F25B 7/00* (2006.01)

(52) U.S. Cl.
CPC ............... *F24D 17/02* (2013.01); *Y02B 30/12* (2013.01); *F24D 2200/24* (2013.01); *F25B 7/00* (2013.01)
USPC .............................. 62/335; 62/238.6; 62/175

(58) Field of Classification Search
CPC .. F25B 2313/004; F25B 7/00; F25B 2400/01; F25B 31/008
USPC ...................... 626/238.6, 246, 332, 333, 335; 62/238.6, 246, 332, 333, 335, 175, 62/181, 183, 513, 129
See application file for complete search history.

(56) References Cited

U.S. PATENT DOCUMENTS 3,984,050 A * 10/1976 Gustafsson .................... 237/2 B
4,293,093 A * 10/1981 Raymond et al. ............... 237/19
(Continued)

FOREIGN PATENT DOCUMENTS

AT 373381 B 1/1984
DE 2516560 A1 10/1975
(Continued)

OTHER PUBLICATIONS

Japanese Office Action issued in Japanese Application No. 2009-127393 dated May 14, 2013, with English translation, 7 pgs.
(Continued)

*Primary Examiner* — Cassey D Bauer
*Assistant Examiner* — Kun Kai Ma
(74) *Attorney, Agent, or Firm* — McDermott Will & Emery LLP

(57) ABSTRACT

A refrigerating apparatus including a first refrigeration cycle circuit having a first compressor, a first radiator, a supercooler, a first pressure-reducing device and an evaporator that are connected through a refrigerant pipe, a second refrigeration cycle circuit having a second compressor, a second radiator, a second pressure-reducing device and the supercooler that are connected through a refrigerant pipe, a refrigeration unit in which the first compressor and the first radiator are mounted, a showcase in which the first pressure-reducing device and the evaporator are mounted, a supercooling hot water supply device in which the second compressor, the second radiator, the second pressure-reducing device and the supercooler are mounted, and a hot-water stock device having a hot water supply tank that is connected to the second radiator of the supercooling hot water supply device through a second radiator.

13 Claims, 5 Drawing Sheets

(56) References Cited

U.S. PATENT DOCUMENTS

| | | | |
|---|---|---|---|
| 5,687,579 A * | 11/1997 | Vaynberg | 62/175 |
| 5,899,091 A * | 5/1999 | Fraser et al. | 62/473 |
| 5,996,362 A * | 12/1999 | Likitcheva | 62/174 |
| 6,679,080 B2 * | 1/2004 | Chiang et al. | 62/246 |
| 2005/0022542 A1 * | 2/2005 | Sakakibara | 62/183 |
| 2006/0086110 A1 * | 4/2006 | Manole | 62/175 |
| 2006/0144076 A1 | 7/2006 | Daddis et al. | |
| 2007/0199337 A1 | 8/2007 | Otake et al. | |
| 2008/0245505 A1 | 10/2008 | Yamaguchi et al. | |
| 2009/0113911 A1 * | 5/2009 | Nakayama | 62/238.6 |
| 2009/0211282 A1 * | 8/2009 | Nishimura et al. | 62/238.6 |
| 2010/0117843 A1 * | 5/2010 | Kobayashi | 340/622 |

FOREIGN PATENT DOCUMENTS

| | | |
|---|---|---|
| EP | 1134514 A1 | 9/2001 |
| FR | 2653863 A1 | 5/1991 |
| JP | 2005-241167 A | 9/2005 |
| JP | 2005-299935 A | 10/2005 |
| JP | 2007-232225 A | 9/2007 |
| JP | 2007-303698 | 11/2007 |
| JP | 2008-008593 A | 1/2008 |
| JP | 2008-185316 A | 8/2008 |
| WO | 2007/046332 A1 | 4/2007 |
| WO | WO 2008150289 A1 * | 12/2008 |

OTHER PUBLICATIONS

Extended European Search Report issued in European Application No. 10005515.1, dated Feb. 19, 2014.

Japanese Office Action issued in Japanese Application No. 2009-127393 dated Nov. 19, 2013, with English Translation.

* cited by examiner

REFRIGERATING APPARATUS

INCORPORATION BY REFERENCE

The present application claims priority under 35 U.S.C. §119 to Japanese Patent Application No. 2009-127393 filed on May 27, 2009. The content of the application is incorporated herein by reference in its entirety.

BACKGROUND OF THE INVENTION

1. Field of the Invention

The present invention relates to a refrigerating apparatus used to chill or freeze foods, etc., and more particularly to a refrigerating apparatus for performing hot-water supply simultaneously with cooling.

2. Description of Related Art

As this type of refrigerating apparatus has been broadly used a refrigerating apparatus which includes a compressor, a radiator, a pressure-reducing device and an evaporator and uses a vapor compression type refrigerating cycle using chlorofluorocarbon or the like as refrigerant. According to this refrigerating apparatus, foods, etc. are cooled by utilizing vaporization of refrigerant in the evaporator of the vapor compression type refrigerating cycle, thereby chilling or freezing the foods, etc.

However, with respect to generally broadly used refrigerating apparatuses, cooling waste heat from the refrigerating cycle is discarded from the radiator to atmosphere or the like. In addition, there is such a situation that hot water is supplied and used by using another heat source such as a boiler or the like in facilities where the refrigerating apparatus as described above is installed and used. As described above, the refrigerating apparatuses which have been hitherto broadly used have a problem that the cooling waste heat is not effectively used. Furthermore, the heat radiated from the radiator in the refrigerating apparatus increases the ambient temperature of the refrigerating apparatus, and thus it has been indicated that the refrigerating apparatus is one of factors causing increase of environmental temperature in city areas.

In such a circumstance, it is attempted to perform hot water supply by effectively using cooling waste heat of the refrigerating cycle so that energy saving is implemented (for example, JP-A-2007-303698).

According to a technique disclosed in JP-A-2007-303698, water for hot water supply is heated by a heat pump cycle using atmospheric air as a heat source (first refrigerant flowing in a first refrigerant circuit), and also the water for hot water supply is heated by waste heat from a refrigerating machine for cooling a showcase (second refrigerant flowing in a second refrigerant circuit), whereby the temperature of the water for hot water supply can be increased in short time.

When cooling based on the vapor compression type refrigerating cycle (heat pump cycle) and heating using waste heat caused by the cooling are performed at the same time as described above, the capacity (performance) ratio between cooling and heating is equal to a value which is roughly determined on the refrigeration cycle theory. Therefore, it is necessary to efficiently perform heat-radiating and heat-absorbing to/from the outside of the system in accordance with the actual load of cooling and heating. Particularly, in a system for freezing or chilling foods in a supermarket or the like, the cooling load increases to be larger than the hot water supply load, and thus it is important to provide a efficient heat radiating unit with avoiding complication of the construction of equipment and increase of installation area of equipment and enhance the cooling capacity (power). Furthermore, it is also necessary to enhance the refrigeration cycle efficiency itself and implement further energy saving, and particularly it is required to enhance the cooling efficiency.

SUMMARY OF THE INVENTION

Therefore, the present invention has been implemented in view of the foregoing situation, and has an object to provide a refrigerating apparatus that can supply hot water by effectively using waste heat when foods, etc. are cooled, enhance cooling capacity (performance) and cooling efficiency and also perform high-efficient operation in accordance with a load variation of cooling and hot water supply.

In order to attain the above object, according to an aspect of the present invention, there is provided a refrigerating apparatus comprising: a first refrigeration cycle circuit including a first compressor, a first radiator, a supercooler, a first pressure-reducing device and an evaporator that are successively connected to one another through a refrigerant pipe; a second refrigeration cycle circuit including a second compressor, a second radiator, a second pressure-reducing device and the supercooler that are successively connected to one another through a refrigerant pipe, refrigerant of the first refrigeration cycle circuit being supercooled by vaporization action of the second refrigeration cycle circuit in the supercooler, and hot-water supply water being warmed by heat radiation action of refrigerant of the second refrigeration cycle circuit in the second radiator; a refrigeration unit in which the first compressor and the first radiator are mounted; a showcase in which the first pressure-reducing device and the evaporator are mounted; a supercooling hot water supply device in which the second compressor, the second radiator, the second pressure-reducing device and the supercooler are mounted; and a hot-water stock device having a hot water supply tank that is connected to the second radiator of the supercooling hot water supply device through a second radiator.

The above refrigerating apparatus may further comprise a third radiator that is disposed in parallel to the second radiator and radiates heat from the refrigerant to atmospheric air.

In the above refrigerating apparatus, the heat radiation from the refrigerant to the atmospheric air may be executed in the third radiator when it is unnecessary to warm the hot-water supply water.

The above refrigerating apparatus may further comprise a water radiator connected to the second radiator through a water pipe, and heat may be radiated from hot-water supply water to atmospheric air in the water radiator.

In the above refrigerating apparatus, the heat radiation from the hot-water supply water to the atmospheric air may be executed when it is unnecessary to warm the hot-water supply water.

The above refrigerating apparatus may further comprise a subsidiary refrigerant circuit that branches a part of refrigerant flowing out from the first radiator and sucks the branched refrigerant into some midpoint of a compression process of the first compressor, a subsidiary throttle unit that is provided on the subsidiary refrigerant circuit and reduces the branched refrigerant to an intermediate pressure that is higher than the suction pressure of the compressor and lower than a discharge pressure of the compressor, and a subsidiary heat exchanger for performing heat-exchange between the branched refrigerant that is reduced in pressure by the subsidiary throttle unit and the refrigerant that is cooled by the first radiator and flows into the supercooler.

In the above refrigerating apparatus, the opening degree of the subsidiary throttle unit may be controlled to be increased when the amount of hot water stocked in the hot water supply tank is large, and reduced when the amount of the hot water is small.

In the above refrigerating apparatus, carbon dioxide is used as the refrigerant filled in the second refrigeration cycle circuit, and the second radiator acts as a gas cooler.

According to the refrigerating apparatus of this invention, the refrigerant of the first refrigeration cycle circuit is supercooled by the vaporization action of the refrigerant of the second refrigeration cycle in the supercooler. Therefore, the refrigeration effect of the first refrigeration cycle (the specific enthalpy difference between the refrigerants at the entrance and exit of the evaporator) is enhanced, and the refrigeration capacity is enhanced. The refrigeration based on the amount corresponding to the supercooling is executed by the second refrigeration which is higher in vaporization temperature (vaporization pressure) than the first refrigeration cycle, and thus the cooling efficiency (coefficient of performance: COP) of the refrigerating apparatus is enhanced. Furthermore, in the second radiator, the hot-water supply water is warmed by the heat radiation action of the refrigerant of the second refrigeration cycle circuit in the second radiator, so that the waste heat based on the cooling corresponding to the supercooling, that is, the increment of the refrigerant capacity can be effectively used to supply hot water. In addition, the refrigerating apparatus is constructed by the refrigeration unit in which the first compressor and the first radiator are mounted, the showcase in which the first pressure-reducing device and the evaporator are mounted, the supercooling hot water supply device in which the second compressor, the second radiator, the second pressure-reducing device and the super cooler are mounted, and the hot water stock device having the hot water supply tank connected through the water pipe to the second radiator of the supercooling hot water supply device. Therefore, by combining a required number of respective constituent devices, there can be easily constructed a power-saving refrigerating apparatus which is adaptable to the cooling load and the hot water supply load and excellent in cooling performance and can perform hot water supply by using cooling waste heat. Furthermore, by using an existing refrigerating apparatus, a high-efficient refrigerating apparatus that can reduce energy consumption can be easily constructed. That is, the supercooling hot water supply device and the hot water stock device are additionally installed in an existing showcase and an existing refrigeration unit, whereby the refrigeration capacity (performance) and the refrigerant efficiency of existing facilities can be enhanced, and hot water can be supplied by effectively using cooling waste heat.

According to the refrigerating apparatus of the present invention, the second refrigeration cycle circuit is provided with the third radiator disposed in parallel to the second radiator, and heat is radiated from the refrigerant to the atmospheric air in the third radiator. Therefore, the refrigerant of the first refrigeration cycle can be supercooled by using the atmospheric air as a heat source. Accordingly, the cooling capacity can be increased without increasing the hot water supply capacity, and the cooling efficiency can be enhanced. As a result, the high-efficient operation can be performed in accordance with the variation of the hot water supply load and the cooling load.

According to the refrigerating apparatus of the present invention, when it is unnecessary to warm the hot-water supply water, heat radiation from the refrigerant to the atmospheric air is performed in the third radiator. Therefore, even when the residual amount of hot water in the hot water supply tank is sufficient, that is, even when it is unnecessary to boil up hot-water supply water, the refrigerant of the first refrigeration cycle is supercooled by the second refrigeration cycle which is higher in vaporization temperature and cooling efficiency than the first refrigeration cycle, whereby the refrigeration capacity and the cooling efficiency can be enhanced.

According to the refrigerating apparatus of the present invention, the water radiator connected to the second radiator through the water pipe is provided, and the heat radiation from the hot-water supply water to the atmospheric air can be performed in the water radiator, so that the supercooling of the first refrigeration cycle circuit can be performed by the second refrigeration cycle circuit without increasing hot water. Accordingly, the cooling capacity is increased without increasing the hot water supply capacity, and the cooling efficiency can be enhanced. As a result, the high-efficient operation can be performed in accordance with the variation of the hot water supply load and the cooling load.

According to the refrigerating apparatus of the present invention, when it is unnecessary to warm the hot-water supply water, the heat radiation from the hot-water supply water to the atmospheric air in the water radiator is executed. Therefore, even under the state that the hot water supply tank is filled with hot water, that is, even under the state that it is unnecessary to supply hot water, the supercooling of the first refrigeration cycle is executed by the second refrigeration cycle which is higher in vaporization temperature and cooling efficiency than the first refrigeration cycle, so that the refrigeration capacity and the cooling efficiency can be enhanced.

According to the refrigerating apparatus of the present invention, in the subsidiary heat exchanger, the refrigerant which is cooled in the first radiator and then flows into the supercooler (main circuit side refrigerant) can be cooled by the refrigerant which flows out from the first radiator of the first refrigeration cycle circuit and then is branched and reduced in pressure (subsidiary circuit side refrigerant). Therefore, the refrigeration effect of the first refrigeration cycle can be increased, and the refrigeration capacity can be enhanced. Furthermore, the subsidiary circuit side refrigerant which has cooled the main circuit side refrigerant is sucked into some midpoint of the compression process at which the pressure is higher than the suction pressure of the first compressor and lower than the discharge pressure of the first compressor. Therefore, as compared with the case where all the refrigerant is compressed from the suction pressure to the discharge pressure without being branched, the compression power can be reduced, and thus the efficiency of the refrigeration cycle can be enhanced.

According to the refrigerating apparatus of the present invention, the opening degree of the subsidiary throttle unit is controlled so as to increase when the amount of hot water stocked in the hot water supply tank is large, and also decrease when the amount of hot water stocked in the hot water supply tank is small, and thus the suitable and high-efficient operation can be performed in accordance with the variation of the hot water supply load. That is, under the condition that the hot waster supply tank is filled with hot water and thus it is unnecessary to warm the hot-water supply water, the opening degree of the subsidiary throttle unit is increased, and the effect of cooling the main circuit side refrigerant in the subsidiary heat exchanger is enhanced, thereby increasing the cooling capacity and the cooling efficiency. On the other hand, when the amount of hot water in the hot water supply tank is small and thus it is necessary to warm the hot-water supply water, the opening degree of the subsidiary throttle unit is reduced, and the effect of cooling the main circuit side refrigerant in the subsidiary heat exchanger is reduced, thereby keeping the temperature and specific enthalpy of the refrigerant flowing in the supercooler to high values. Accordingly, the exchange heat quantity in the supercooler, that is, the heat absorption amount of the second refrigeration cycle is increased, and also the vaporization temperature of the second refrigeration cycle is increased. As a result, the heating capacity and the hot-water supply efficiency of the second refrigeration cycle can be enhanced.

According to the refrigerating apparatus of the present invention, carbon dioxide is used as the refrigerant filled in the second refrigeration cycle circuit, and the second radiator acts as a gas cooler. Therefore, high-temperature hot water can be boiled up with high efficiency.

DETAILED DESCRIPTION OF THE PREFERRED EMBODIMENTS

Preferred embodiments according to the present invention will be described hereunder with reference to the accompanying drawings.

A refrigerating apparatus according to a first embodiment will be described hereunder in detail with reference to FIG. 1.

Figure 1:
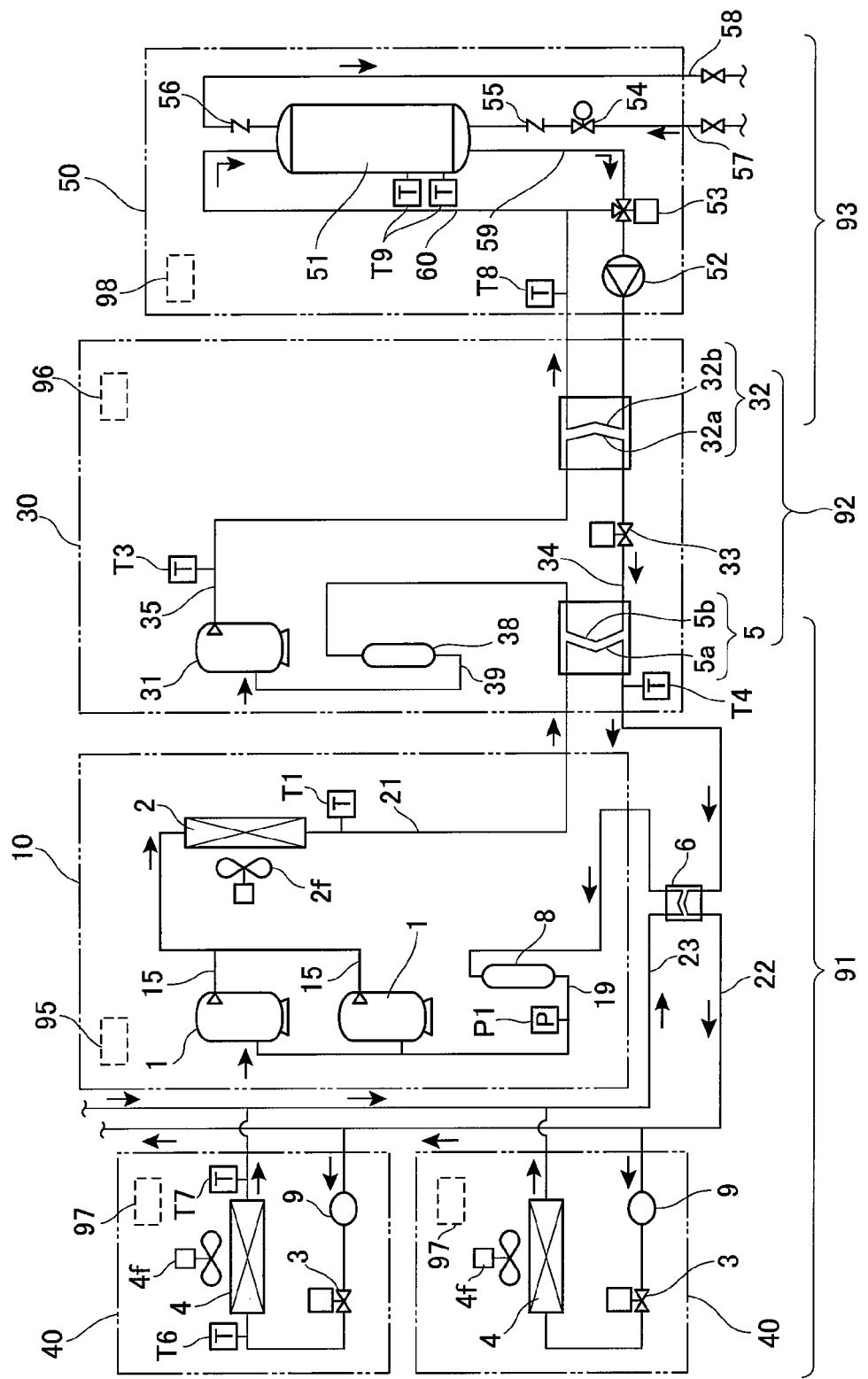
FIG. 1 is a diagram showing the construction of a refrigerating apparatus according to a first embodiment of the present invention.

FIG. 1 is a diagram showing a refrigerating apparatus according to a first embodiment of the present invention. The refrigerating apparatus according to the first embodiment has a first refrigeration cycle circuit 91, a second refrigeration cycle circuit 92 and a hot water supply circuit 93. A refrigerating machine (element parts) constituting the refrigeration circuit are mounted and unitized, thereby constructing a refrigeration unit 10, a supercooling hot water supply device 30, a showcase 40 and a hot water stock device 50.

The first refrigeration cycle circuit 91 comprises a first compressor 1, a first radiator 2, a first refrigeration cycle circuit side flow path 5a of a supercooler 5, a high-pressure side flow path of an internal heat exchanger 6, a strainer 9, an expansion valve 3 as a first pressure-reducing device, an evaporator 4, a low-pressure side flow path of an internal heat exchanger 6 and an accumulator which are connected to one another through a refrigerant pipe so as to form a closed circuit in which refrigerant flows through the above elements in this order and then returns to the first compressor 1. R404A is adopted as refrigerant of the first refrigeration cycle. However, other refrigerant, for example, fluorocarbon type refrigerant such as R407, R134a or the like, or natural refrigerant such as carbon dioxide (R744), ammonium (R717) or the like may be adopted as the refrigerant of the first refrigerant cycle.

The first compressor 1 compresses refrigerant, and a well-known compressor such as a scroll type compressor, a reciprocating type compressor, a screw type compressor, a rotary type compressor or the like may be used as the first compressor 1. In this embodiment, the scroll type compressor is used. Furthermore, two or more first compressors 1 may be provided, whereby the capacity control (quantity control) can be performed in accordance with a cooling load. Furthermore, the first compressor 1 according to this embodiment is an inverter driving type, however, a constant-rate type may be adopted. According to the inverter driving system, the rotational number of the compressor can be changed in accordance with the cooling load, and the higher-efficient operation can be performed as compared with the quantity control of the constant-rate type compressor which repeats start/stop of the compressor.

The first radiator 2 is a heat exchanger for radiating heat of refrigerant to the atmospheric air, and a fin-and-tube type heat exchanger may be adopted. The second radiator 2 has a fan 2f for supplying air to be heat-exchanged with refrigerant. A refrigerant temperature sensor T1 for detecting the temperature of refrigerant at the exit of the radiator is provided to an exit-side pipe 21 of the first radiator 2.

The supercooler 5 is a heat-exchanger for further cooling the refrigerant of the first refrigerant cycle circuit 91 which is cooled by radiating heat to the atmospheric air in the first radiator 2. The supercooler 5 has a first refrigeration cycle circuit side flow path 5a and a second refrigeration cycle circuit side flow path 5b so that the refrigerant flowing through the flow path can be heat-exchanged. The respective flow paths are configured so that the refrigerant flowing directions thereof are opposite to each other (i.e., these flow paths 5a and 5b are counterflow flow paths). Accordingly, the efficiency of the heat exchange is enhanced, and the supercooling degree of the refrigerant at the first refrigeration cycle circuit side, that is, the temperature difference between the entrance and exit of the supercooler 5a can be increased. A plate type heat exchanger is used as the supercooler 5 according to this embodiment. In place of the plate type heat exchanger, various types of heat exchangers such as a double-tube type, a tube contact type, etc. may be adopted as the supercooler 5. The plate type heat exchanger is excellent in that the heat-exchange efficiency is high and an occupation space of the heat exchanger can be reduced. The double-tube type and the tube contact type are excellent in that manufacturing and processing can be easily performed and the compression strength can be easily increased.

The internal heat exchanger 6 is a heat exchanger for heat-exchanging high-pressure refrigerant discharged from the supercooler 5 with low-pressure refrigerant flowing out from the evaporator 4 to cool the high-pressure refrigerant and heat the low-pressure refrigerant. The internal heat exchanger 6 has a high-pressure side flow path and a low-pressure side flow path, and is configured so that refrigerant flowing in the high-pressure side flow path and refrigerant flowing in the low-pressure side flow path can be heat-exchanged with each other and also the flowing directions of both the flow paths are opposite to each other. A plate type heat exchanger is used as the internal heat exchanger 6 according to this embodiment, however, various other types of heat exchangers such as the double-tube type, the tube contact type, etc. can be adopted in place of the plate type heat exchanger. Furthermore, as a simple method, a refrigerant going pipe 22 and a refrigerant returning pipe may be constructed to be in contact with each other, thereby constructing the internal heat exchanger 6.

The strainer 9 is provided to the upstream side refrigerant pipe of the expansion valve 3 to remove foreign materials in the refrigerant circuit and prevent troubles such as clogging of the expansion valve 3. When fluorocarbon type refrigerant is used, a dryer for driving water in the refrigerant circuit may be provided.

The expansion valve 3 as the first pressure-reducing device reduces the pressure of high-pressure and low-temperature flowing through the refrigerant going pipe 22 by throttle expansion to obtain low-pressure and low-temperature refrigerant (normal gas-liquid two-phase state). A capillary tube, a temperature type expansion valve, an electrically-operated expansion valve or the like may be adopted as the expansion valve 3. In the refrigerating apparatus according to this embodiment, the electrically-operated expansion valve is used. A control device 97 controls the opening degree of the expansion valve 3 so that the difference between the superheat degree of the refrigerant at the exit side of the evaporator 4, that is, the refrigerant temperature at the exit of the evaporator 4 detected by an evaporator exist refrigerant temperature sensor T7 described later, and the refrigerant temperature at the entrance of the evaporator 4 detected by an evaporator entrance refrigerant temperature sensor T6 described later is equal to a predetermined value.

The evaporator 4 is a heat exchanger for cooling foods, etc. by heat absorption based on vaporizing action of refrigerant, and a fin-and-tube type heat exchanger is used as the evaporator 4. An evaporator entrance refrigerant temperature sensor T6 for detecting the refrigerant temperature at the entrance of the evaporator 4 is provided at the entrance pipe of the evaporator 4, and an evaporator exit refrigerant temperature sensor T7 for detecting the refrigerant temperature at the exit of the evaporator 4 is provided to the exit pipe of the evaporator 4. Furthermore, the evaporator 4 has a fan 4f for supplying air to be heat-exchanged with refrigerant and thus cooled. In the evaporator 4, air supplied by the fan 4f is cooled by vaporization of refrigerant and reduced in temperature, and then the cooled air is supplied to a cold storage space for foods, etc.

The accumulator 8 prevents liquid refrigerant from being sucked into the first compressor 1, and it has a function of performing gas-liquid separation therein and temporarily stocks liquid refrigerant. Particularly, it exercises the function when the apparatus is actuated or a defrosting operation or the like is executed. Furthermore, a pressure sensor P1 for detecting the pressure of the refrigerant sucked into the compressor is secured to the pipe 19 connected from the accumulator 8 to the suction port of the compressor.

Next, the construction of the second refrigerating cycle circuit 92 will be described. The second refrigerating cycle circuit 92 comprises a closed circuit including a second compressor 31, a refrigerant flow path 32a of a second radiator 32, an expansion valve 33 as a second pressure-reducing device, a second refrigeration cycle circuit side flow path 5b of a supercooler and an accumulator 38 through which refrigerant flows through these elements in this order and then returns to the second compressor 31.

In the refrigerating apparatus according to this embodiment, carbon dioxide is sealingly filled as refrigerant for the second refrigerant cycle, and the refrigeration cycle using carbon dioxide refrigerant becomes a transcritical cycle in which the high-pressure side exceeds critical pressure. Therefore, this type of refrigerating apparatus has an advantage that water can be heated to high temperature with high efficiency. As in the case of the first refrigeration cycle, other types of refrigerant may be adopted.

The second compressor 31 is used to compress the low-pressure refrigerant and obtain high-pressure refrigerant. In the refrigerating apparatus according to this embodiment, carbon dioxide is used as refrigerant, and thus the pressure of refrigerant discharged from the second compressor 31 exceeds the critical pressure. The second compressor 31 is a rotary type two-stage compression type having a low-pressure side compressing element, that is, a first stage compressing element, and a high-pressure side compressing element, that is, as a second stage compressing element. The two-stage compression type brings an advantage that the pressure ratio of the compressing elements can be reduced at the respective stages, and refrigerant can be compressed till high pressure with high efficiency. With respect to the second compressor 31, one-stage compression type such as a scroll type, a rotary type or the like, or other types of compressors may be adopted as the second compressor 31. Furthermore, the second compressor 31 is driven by an inverter, and the number of rotation under operation can be changed. Accordingly, supercooling capacity and hot-water supply capacity can be changed in accordance with a refrigeration load, and thus the capacity control can be performed with high efficiency. Furthermore, a discharge refrigerant temperature sensor T3 for detecting the temperature of refrigerant discharged from the second compressor 31 is provided to the discharge pipe 35 of the second compressor d31.

The second radiator 32 is a heat exchanger for performing heat-exchange between refrigerant and water and heat hot supply water to boil water. A refrigerant flow path 32a and a water flow path 32b of the second radiator 32 are configured so as to be heat-exchangeable with each other and so that the flow directions thereof are opposite to each other. The refrigerant pressure in the refrigerant flow path 32a of the second radiator 32 exceeds critical pressure, and thus the second radiator 32 acts as a gas cooler. That is, the refrigerant is not condensed in the refrigerant flow path 32a of the second radiator 32, and the temperature thereof is lowered as it supplies heat to water to be cooled. Accordingly, as described above, the respective flow paths are configured so that the flow directions of the refrigerant and the water are opposite to each other, whereby high-temperature water can be boiled with high efficiency.

The refrigerant flow path 32a of the second radiator 32 are constructed by plural slender circular tubes to endure high pressure. The water flow path 32b is formed by superimposing two plate-shaped members and joining the peripheries thereof to each other to form a space sandwiched by the plate members. A partition member for guiding water flow is provided in the space and an inlet portion and an outlet portion for water are also formed. The slender tubes constituting the refrigerant flow path 32a are joined to the outer surfaces of the plate members constituting the water flow path 32b so as to be heat-exchangeable with the plate members. Another type of heat exchanger such as a double-tube type, a tube joint type or the like may be adopted as the gas cooler.

The expansion valve 33 as a second pressure-reducing device is used to set high-pressure refrigerant to a low-pressure state by throttle expansion. The expansion valve 33 is an electrically-operated expansion valve, and the opening degree of the expansion valve 33 is controlled by a controller 96 so that the temperature of refrigerant discharged from the second compressor 31 which is detected by a discharge refrigerant temperature sensor T3 is equal to a predetermined value, whereby hot water can be supplied with high efficiency. Other types of throttle devices such as a temperature type expansion valve, a constant-pressure expansion valve, a capillary tube, etc. may be adopted as the expansion valve 33.

As described above, the supercooler 5 is a heat exchanger for performing heat exchange between the refrigerant of the first refrigeration cycle circuit 91 and the refrigerant of the second refrigeration cycle circuit 92 to supercool the refrigerant of the first refrigeration cycle circuit 91. The construction of the supercool 5 has been already described above. The second refrigeration cycle circuit side flow path 5b functions as an evaporator, and the refrigerant in the second refrigeration cycle circuit side flow path 5b absorbs heat to be evaporated. A supercool temperature sensor T4 for detecting the temperature of refrigerant in the first refrigeration cycle after the refrigerant is supercooled is provided to the outlet pipe of the first refrigeration cycle side flow path 5a of the supercooler 5.

An accumulator 38 is used to prevent suction of liquid refrigerant into the first compressor 1, and the function thereof is identical to that of the accumulator 8 of the first refrigeration cycle circuit 91.

Next, the construction of the hot water circuit 93 will be described.

The hot water supply circuit 93 has a hot water supply tank 51, a circulating pump 52 and the water flow path 32b of the second radiator 32 which are connected to one another through a pipe so that water for hot water supply flows through these elements in this order and then returns to the hot water supply tank 51. Here, a pipe 59 connected to the suction side of the circulating pump 52 is connected to the lower portion of the hot water supply tank 51, whereby low-temperature water can be supplied to the second radiator 32. Furthermore, a pipe 60 connected to the exit of the water flow path 32b of the second radiator 32 is connected to the upper portion of the hot water supply tank 51. Accordingly, high-temperature hot water heated in the second radiator 32 is returned to the upper portion of the hot water tank 51, whereby hot water can be stocked on a temperature stratification in the hot water tank 51.

A hot water supply pipe 58 is connected to the upper portion of the hot water supply tank 51 of the hot water supply circuit 93 through a check valve 56, and a water supply pipe 57 is connected to the lower portion of the hot water supply tank 51 through a pressure-reducing valve 54 and a check valve 55. The hot water supply pipe 58 is a pipe for supplying hot water from the hot water supply tank 51 to hot water supply load facilities which require hot water, and the water supply pipe 57 is used to supply city water to the hot water supply tank 51.

When a hot water valve is opened in the hot water supply load facilities, high-temperature hot water flows from the upper portion of the hot water supply tank 51 through the hot water supply pipe 58 to be supplied. In connection with this flow, cool water flows through the water supply pipe 57 and is supplied to the lower portion of the hot water supply tank 51. A mixing valve may be further provided to mix low-temperature hot water (i.e., water) taken out from the lower portion of the hot water supply tank 51 with high-temperature hot water taken out from the upper portion of the tank 51 so that the temperature of hot water to be supplied to the hot water supply load facilities is set to a predetermined temperature.

Plural temperature sensors T9 for detecting the temperature of hot-water supply water stocked in the tank are provided to the outer surface of the hot water supply tank 51 so as to be located at different height positions. Accordingly, a temperature distribution of the inside of the hot water supply tank 51 can be measured, and thus the amount of high-temperature hot water in the hot water supply tank 51 can be grasped on the basis of the measured temperature distribution. Furthermore, a temperature sensor T8 for detecting the temperature of hot water warmed in the second radiator 32 is secured to the pipe 60 at the exit side of the water flow path 32b of the second radiator 32.

The hot water supply circuit 93 has a bypass pipe for connecting the low-temperature pipe 59 and the high-temperature pipe 60 and a three-way valve 53. The three-way valve 53 switches a water supply source for supplying water to the circulating pump 52 so that the water supply source is switched to one of the low-temperature pipe 59 side connected to the hot water supply tank 51 and the bypass pipe side. Normally, when hot water is boiled up through the second refrigeration cycle, the three-way valve 53 switches the water supply source to the low-temperature pipe 59 side connected to the hot water tank 51. The three-way valve 53 is switched so that water from the bypass pipe side is supplied to the circulating pump 52, there is formed a closed circuit in which water pushed out from the circulating pump 52 flows into the water flow path 32b of the second radiator 32, passes through the three-way valve 53 and then returns to the circulating pup 52. The closed circuit as described above is formed just after the boil-up operation based on the second refrigeration cycle described above is executed or after the operation is stopped.

Next, the construction of a unit in which the respective refrigeration equipment is accommodated will be described.

The refrigeration unit 10 has the first compressor 1 for compressing refrigerant, the first radiator 2 for radiating, to the atmospheric air, the heat of refrigerant which is compressed in the first compressor 1 and thus increased in temperature and pressure, and the accumulator 8 for preventing suction of liquid refrigerant into the first compressor 1. As described above, the refrigerant discharge pipe 15 of the first compressor 1 is connected to the first radiator 2 so that refrigerant can flow into the first radiator 2, and the refrigeration suction pipe 19 of the first compressor 1 is connected to the accumulator 8. The refrigeration unit 10 contain a controller 95, a radiator exit refrigerant temperature sensor T1, a suction pressure sensor P1, a temperature sensor (not shown), a pressure sensor (not shown), etc. The refrigeration unit 10 has a refrigerant going pipe connection port connected to the refrigerant exit side pipe 21 of the first radiator 2, and a refrigerant return pipe connection port connected to the accumulator 8.

The showcase 40 has an expansion valve 3 for reducing the pressure of high-pressure refrigerant, an evaporator 4 for cooling foods, etc. by vaporization action of refrigerant, and a strainer 9 for removing foreign materials in the refrigerant circuit. Furthermore, the showcase 40 has a controller 97, an evaporator entrance refrigerant temperature sensor T6, an evaporator exist refrigerant temperature sensor T7, a group of other refrigerant temperature sensors, a space for storing foods, etc., display shelves, etc. The showcase 40 has a refrigerant entrance pipe connection port connected to the strainer 9, and a refrigerant exit pipe connection port connected to the exit side of the evaporator 4. Plural showcases 40 may be provided as occasion demands. With respect to each of the showcases 40, the refrigerant entrance pipe connection port of the showcase 40 is connected to the refrigerant going pipe 22, and the refrigerant exit pipe connection port is connected to the refrigerant return pipe 23. The showcase 40 is not limited to a showcase for displaying and exhibiting objects to be cooled, and it may be a cold storage room which is not used for exhibition.

A supercooling hot water supply device 30 has refrigeration equipment constituting the second refrigeration cycle circuit 92 containing the supercooler 5, that is, the second compressor 31, the second radiator 32, the expansion valve 33 as the second pressure-reducing device, the supercooler 5 and the accumulator 38. Furthermore, the supercooling hot water supply device 30 has the controller 96, the discharge refrigerant temperature sensor T3, the supercool temperature sensor T4 and a group of other refrigerant temperature sensors and pressure sensors. The supercooling hot water supply device 30 has a connection port for the pipe 21 into which the refrigerant of the first refrigeration cycle to be supercooled flows, a pipe connection port through which the supercooled refrigerant flows out, a pipe connection port through which a hot-water supply water (cold water) flows into the second radiator 32, and a pipe connection port through which the hot-water water (hot water) heated in the second radiator 32 flows out.

A hot water stock device 50 has the hot water tank 51, the three-way valve 53 and the circulating pump 52. The hot water stock device 50 has a controller 98, a temperature sensor T8, a temperature sensor T9, a group of other temperature sensors, the pressure-reducing valve 54, the check valve 55 and the check valve 56. Plural hot water supply tanks 51 may be provided in series or in parallel in accordance with the amount of hot water to be stocked.

As described above, the refrigerating apparatus according to this embodiment is constructed by the refrigeration unit 10, the supercooling hot water supply device 30, the showcase 40 and the hot water stock device 50 each of which is configured as a unit (i.e., unitized). Therefore, this embodiment has an advantage that the installation work can be easily performed. That is, after the refrigeration unit 10, the supercooling hot water supply device 30, the showcase 40 and the hot water stock device 50 are installed on the construction spot, the pipe connection ports of the respective devices which are configured as units (unitized) so as to constitute the first refrigeration cycle circuit 91, the second refrigeration cycle circuit 92 and the hot water supply circuit 93 may be connected to one another through pipes. In this case, the installation number of the respective unitized devices may be selected in accordance with a cooling load or a hot water supply load required on the installation spot, and the required number of devices may be combined.

Furthermore, the refrigerating apparatus of this embodiment can be easily constructed by improving existing facilities. For example, the refrigerating apparatus according to this invention may be constructed by directly using existing refrigerating machine (corresponding to the refrigerating unit 10) and an existing showcase (corresponding to the showcase 4, newly adding the supercooling hot-water supply device 30 and the hot water stock device 50, cutting a part of an existing refrigerant going pipe (high-pressure refrigerant pipe) and connecting the existing refrigerant going pipe to the refrigerant pipe connection port of the supercooling hot water supply device 30.

Next, the operation of the refrigerating apparatus according to the first embodiment will be described.

In the first refrigeration cycle circuit 91, the low-temperature refrigerant vapor is sucked into the first compressor 1 and discharged as high-pressure refrigerant vapor from the first compressor 1. This refrigerant flows into the first radiator 2, and is heat-exchanged with the atmospheric air to be cooled. In this embodiment, R404A is used as the refrigerant of the first refrigeration cycle, and thus the refrigerant cooled in the first radiator 2 is condensed into high-pressure and low-temperature liquid refrigerant.

The refrigerant cooled in the first radiator 2 flows into the first refrigeration cycle circuit side flow path 5a of the supercooler 5, and supercooled in the flow path 5a by the vaporization action of the refrigerant of the second refrigeration cycle which flows in the second refrigerant cycle circuit side flow path 5b. Accordingly, the specific enthalpy of the refrigerant is further reduced, and thus the refrigerating effect is more enhanced as compared with the case where the refrigerant is not supercooled in the supercooler 5.

The high-pressure and low-temperature liquid refrigerant flowing out from the supercooler 5 flows through the high-pressure side flow path of the internal heat exchanger 6, and it is heat-exchanged with the low-pressure and low-temperature refrigerant flowing in the low-pressure side flow path of the internal heat exchanger 6 and cooled there. Since the high-pressure refrigerant is cooled by the internal heat exchanger 6, occurrence of flash gas in the refrigerant going pipe 22 is prevented, and the low-pressure refrigerant is heated, so that an effect of preventing wet compression of the first compressor 1 can be obtained. Furthermore, by adopting the internal heat exchanger 6, a large two-phase area having a higher heat transfer coefficient can be secured in the evaporator 4, so that the heat transfer performance of the evaporator 4 can be enhanced and the cycle performance can be enhanced.

After the refrigerant flowing out from the high-pressure side flow path of the internal heat exchanger 6 flows through the refrigerant going pipe 22 and passes through the strainer 9, the refrigerant is subjected to throttle expansion (isentropic expansion) by the expansion valve 3 and then flows to the evaporator 4. The refrigerant flowing into the evaporator 4 is under a low-pressure gas-liquid two-phase state. In the evaporator 4, the refrigerant is heat-exchanged with cooling target air supplied by a fan 4f to cool the air, and a liquid-phase portion of the refrigerant is vaporized. At the exit of the evaporator 4, the refrigerant becomes slightly superheated vapor. The supply of the refrigerant to the evaporator 4 is adjusted by controlling the opening degree of the expansion valve 3 under the control of the controller 97 so that the refrigerant is set to the slightly superheated state at the exit of the evaporator 4 as described above.

The refrigerant flowing out from the evaporator 4 passes through the refrigerant return pipe 23, and flows into the low-pressure side flow path of the internal heat exchanger 6 so as to be heat-exchanged with the high-pressure liquid refrigerant flowing in the high-pressure side flow path and superheated. Then, the refrigerant passes through the accumulator 8 so as to be perfectly subjected to gas-liquid separation, and then flows into the suction port of the first compressor 1 to be compressed. As described above, the first refrigeration cycle is continuously operated, and the refrigeration performance is exercised in the evaporator 4. The air cooled in the evaporator 4 is circulated in the cold storage space to freeze and chill cooling target objects such as foods, etc.

The operation of the first compressor 1 is controlled by the controller 95 contained in the refrigeration unit 10. Specifically, the rotational number of the first compressor 1 and the start/stop of the first compressor 1 are performed so that the pressure of the low-pressure refrigerant detected by the suction pressure sensor P1 provided to the suction refrigerant pipe 19 is set in a predetermined pressure range. A cold storage set temperature of a cooling target space is read through communications with the controller 97 provided to the showcase 40, and the predetermined pressure range is set so as to obtain a suitable refrigeration cycle. Accordingly, high-efficient cooling corresponding to the cooling load is performed.

In the second refrigeration cycle circuit 92, the low-temperature refrigerant vapor is sucked into the second compressor 31 and compressed into high-temperature and high-pressure refrigerant. Since carbon dioxide is used as refrigerant in the second refrigeration cycle, the pressure of the refrigerant discharged from the compressor 31 exceeds the critical pressure. The refrigerant compressed in the second compressor 31 flows into the refrigerant flow path 32a of the second radiator 32 so that it is heat-exchanged with hot-water supply water flowing in the water flow path 32b and cooled. The refrigerant is not condensed in the second radiator 32 because it is under the supercritical state, and the temperature of the refrigerant is lowered as it is heat-exchanged with the water and cooled. As descried above, the refrigerant flow path 32a and the water flow path 32*b* of the second radiator 32 are configured so that the flowing direction thereof are opposite to each other. Therefore, the heat-exchange between the supercritical refrigerant having a temperature gradient caused by heat-exchange and water can be performed efficiently. The refrigerant cycle of the present invention uses carbon dioxide refrigerant which implements a transcritical cycle, and thus this embodiment ahs an advantage that high-temperature hot water can be boiled with high efficiency as compared with a case where fluorocarbon type refrigerant which is condensed under a fixed temperature in the high-pressure side heat exchanger is used.

The high-pressure supercritical refrigerant cooled in the second radiator 32 is throttled by the expansion valve 33 and subjected to isentropic expansion, and then flows into the second refrigeration cycle circuit side flow path 5*b* of the supercooler 5. The refrigerant flowing in the supercooler 5 is under the gas-liquid two-phase state. In the supercooler 5, the refrigerant of the second refrigeration cycle circuit 92 is heat-exchanged with the refrigerant of the first refrigeration cycle which flows through the first refrigeration cycle circuit side flow path 5*a*, and the liquid-phase portion thereof is vaporized. The refrigerant of the first refrigeration cycle is supercooled by the vaporization action of the refrigerant of the second refrigeration cycle.

The low-temperature vaporized refrigerant flowing out from the second refrigeration cycle circuit side flow path 5*b* of the supercooler 5 flows into the accumulator 38 to be perfectly subjected to gas-liquid separation, and then flows into the suction port of the second compressor 31 to be compressed again. The above-described operation is continuously executed, whereby the supercooling of the first refrigerant cycle by the second refrigeration cycle and the heating of the hot-water supply water using waste heat thereof can be performed.

The rotational number of the second compressor 31 and the opening degree of the expansion valve 33 are controlled by the controller 96 provided to the supercooling hot-water supply device 30. The rotational number of the second compressor 31 is adjusted so that the refrigerant temperature of the first refrigeration cycle after the supercooling which is detected by the supercooling temperature sensor T4 provided to the first refrigeration cycle circuit side exit of the supercooler 5 is equal to a predetermined value. Accordingly, the proper supercooling degree corresponding to the cooling load can be implemented, and the cooling operation can be performed with high efficiency. Furthermore, the controller 96 of the supercooling hot water supply device 30 communicates with the controller 95 provided to the refrigeration unit 10, and controls the start/stop of the second compressor 31 interlockingly with the start/stop of the first compressor 1 of the first refrigeration cycle circuit 91, whereby an unnecessary supercooling operation can be prevented from being executed when the first compressor 1 of the first refrigerating cycle circuit 91 is stopped.

The opening degree of the expansion valve 33 is adjusted so that the discharge refrigerant temperature detected by the discharge refrigerant temperature sensor T3 provided to the discharge pipe 35 is equal to a predetermined value. Accordingly, a suitable cycle condition for boiling up hot water to a predetermined temperature can be kept, and the supercooling and the hot water supply can be performed with high efficiency.

In the hot water supply circuit 93, cold water taken out from the lower portion of the hot water supply tank 51 is made to flow through the low-temperature pipe 59, passed through the three-way valve 53, pushed out by the circulating pump 52 and then made to flow into the water flow path 32*b* of the second radiator 32. As described above, in the second radiator 32, the water concerned is heat-exchanged with the high-temperature and high-pressure refrigerant of the second refrigeration cycle and heated. Then, the hot-water supply water which is heated to high temperature flows into the high-temperature pipe 60, and flows from the upper portion of the hot water supply tank 51 into the inside of the tank.

The temperature of the boiled hot water is adjusted by the controller 98 of the hot water stock device 50 so that the temperature concerned is equal to a predetermined temperature. Specifically, the flow rate of the circulating hot-water supply water is controlled by changing the rotational number of the circulating pump 52 so that the water temperature at the exit of the second radiator 32*b* which is detected by the temperature sensor T8 secured to the high temperature pipe 60 is equal to a predetermined value. In place of the method of controlling the rotational number of the circulating pump 52, a flow rate may be adjusted by a separately provided flow rate adjusting value may be used as the method of adjusting the flow rate of the circulating water.

As described above, according to the refrigeration device of the present invention, the refrigerant of the first refrigeration cycle circuit 91 is supercooled by the vaporization action of the refrigerant of the second refrigeration cycle circuit 92 in the super cooler 50. Therefore, the refrigeration effect of the first refrigeration cycle is enhanced, and the refrigeration capacity (performance) is also enhanced. The refrigeration is performed by the amount corresponding to the supercooling through the second refrigeration cycle whose vaporization temperature (vaporization pressure) is higher than the first refrigeration cycle, and thus the cooling efficiency of the refrigerating apparatus can be enhanced. Furthermore, the hot-water supply water is warmed by the radiation action of the refrigerant of the second refrigeration cycle circuit 92 in the second radiator 32. Therefore, the hot water supply can be performed by effectively using waste heat obtained by the cooling which is executed by the amount corresponding to the supercooling described above, that it, the enhancement of the refrigeration performance (capacity).

Furthermore, according to this embodiment, the refrigeration devices are respectively unitized, and the refrigerating apparatus of this embodiment is constructed by the refrigeration unit 10, the showcase 40, the supercooling hot-water supply device 30 and the hot water stock device which are unitized. Accordingly, an energy-saving refrigerating apparatus which is adaptable to a cooling load and a hot-water supply load, excellent in cooling performance and can supply hot water by using cooling waste heat can be constructed by combining a required number of various constituent devices. Furthermore, a high-efficient refrigerating apparatus which can reduce the energy consumption can be constructed by using an existing refrigerating apparatus. That is, the super cooling hot water supply device 30 and the hot water stock device 50 are additionally installed in an existing showcase (corresponding to the showcase 40), whereby hot water can be supplied with enhancing the refrigeration performance and the refrigeration efficiency of existing equipment and also effectively using cooling waste heat.

Next, a refrigerating apparatus according to a second embodiment according to the present invention will be described with reference to FIG. 2.

Figure 2:
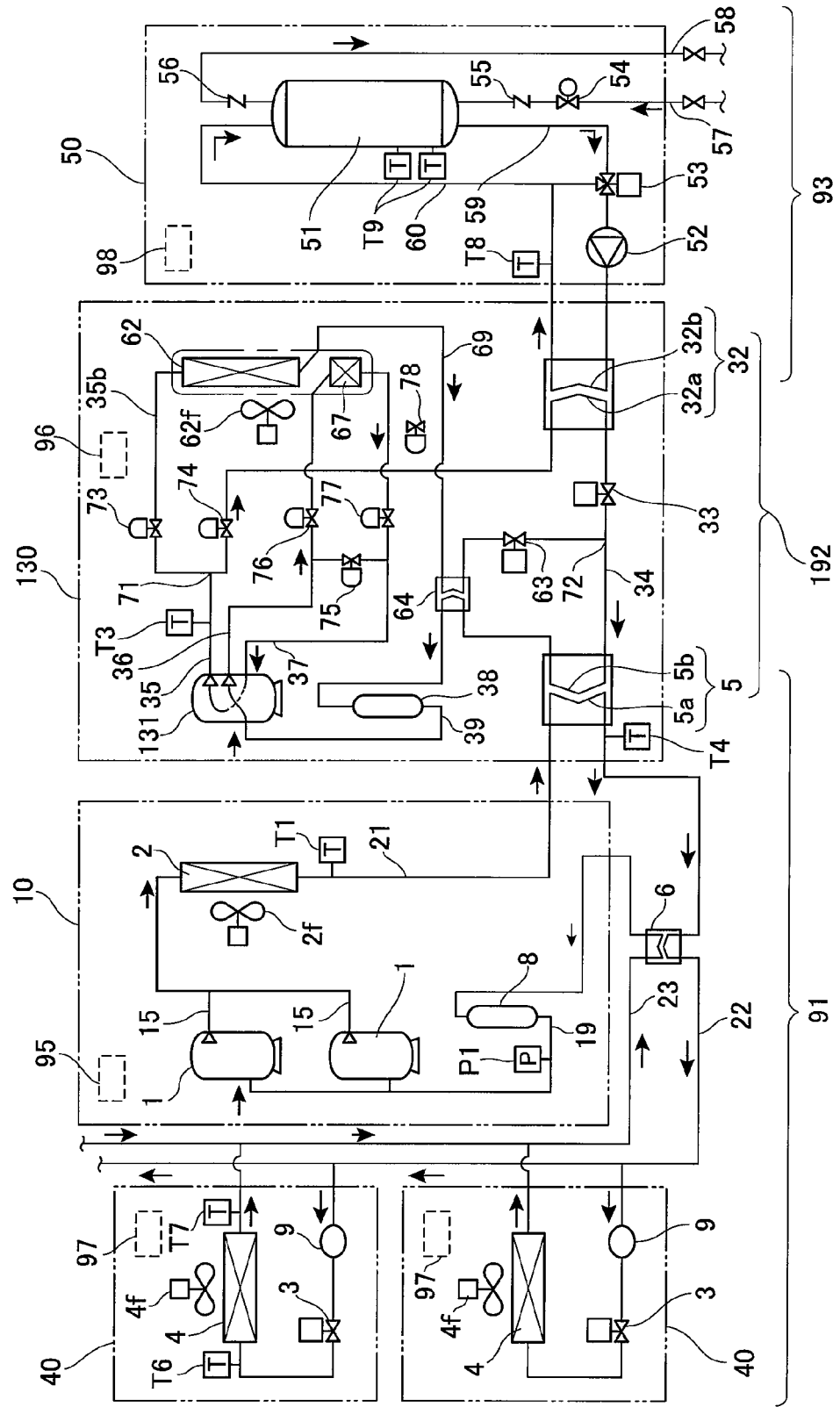
FIG. 2 is a diagram showing the construction of a refrigerating apparatus according to a second embodiment of the present invention.

FIG. 2 is a diagram showing the construction of a refrigerating apparatus according to a second embodiment of the present invention.

In FIG. 2, the constituent elements having the action and effect which are identical or similar to those of the refrigerating apparatus according to the first embodiment are represented by the same reference numerals. In the refrigerating apparatus of the second embodiment, a unit for radiating heat from refrigerant to the atmospheric air is provided to a second refrigeration cycle circuit 192. The refrigerating apparatus of the second embodiment is different from the refrigerating apparatus of the first embodiment in this point. The first refrigeration cycle circuit 91, the hot water supply circuit 93, the refrigeration unit 10 in which the equipment constituting these elements are mounted, the showcase 40 and the hot water stock device 50 have the same constructions and the same action and effect as the refrigerating apparatus according to the first embodiment. Therefore, the description of the same constituent elements is omitted, and only the different point from the first embodiment will be described in detail.

The second refrigeration cycle circuit 192 according to the second embodiment has a closed circuit in which refrigerant successively flows through the second compressor 131, a change-over valve 74, the refrigerant flow path 32a of the second radiator 32, the expansion valve 33 as the second pressure-reducing device, the second refrigerant cycle circuit side flow path 5b of the supercooler 5, the low-pressure side flow path of the internal heat-exchanger 64 and the accumulator 38 in this order and returns to a suction port of a first-stage compressing element of a second compressor 131. The first refrigeration cycle is supercooled by the refrigeration cycle (hereinafter referred to as "hot water supply cycle") constructed by this closed circuit (hereinafter referred to as "hot water supply cycle circuit"), and at the same time hot water supply is performed by using waste heat based on the supercooling.

In addition, the second refrigeration cycle circuit 192 according to this embodiment has a refrigerant circuit in which refrigerant discharged from an intermediate pressure portion, that is, a first-stage compressing element of the second compressor 131 successively flows through a pipe 36, a change-over valve 76, an intermediate cooler 67 and a change-over valve 77 in this order and then returns to a suction portion of a second-stage compressing element of the second compressor 131. Furthermore, the second refrigeration cycle circuit 192 according to this embodiment has also a refrigerant circuit in which refrigerant is branched from a branch portion 71 provided to the discharge pipe 35 of the second compressor 131, successively flows through a change-over 73, a third radiator 62, a high-pressure side flow path of the internal heat exchanger 64 and an expansion valve 63 as a third pressure-reducing device in this order and then reaches a joint point 72 provided to the pipe 34.

The second refrigeration cycle circuit 192 has a bypass pipe for connecting a pipe 36 of a first-stage discharge port of the second compressor 131 and a pipe 37 of a second-stage suction port through the change-over valve 75. The bypass pipe concerned bypasses the intermediate cooler 67 to supply refrigerant therethrough when the hot water supply circle circuit is constructed.

Furthermore, the second refrigeration cycle circuit 192 has a pipe for connecting an exit-side pipe of the intermediate cooler 67 and an exit-side pipe 69 of the second gas cooler through the change-over valve 78. The connection pipe concerned is a pipe for connecting the space of the intermediate cooler 67 portion and the space of the third radiator 62 portion which are sealed by the change-over valve 76 and the change-over valve 77 when the hot water supply cycle circuit is constructed. Accordingly, the stock refrigerant amount of the intermediate cooler 67 portion during hot water supply cycle operation can be adjusted, and abnormally high pressure of the portion concerned can be prevented. In addition, the circulating refrigerant amount in the hot water supply cycle can be suitably maintained and the cycle performance can be enhanced.

With respect to the connection place of the connection pipe concerned, the exit-side pipe of the intermediate cooler 67 may be set to the entrance-side pipe of the intermediate cooler 67, and the pipe 69 side may be set to any place on the pipe from the change-over valve 73 to the first-stage suction port of the second compressor 131.

By the added refrigerant circuit described above, the refrigeration cycle which radiates heat to the atmospheric air when it is unnecessary to warm the hot-water supply water (hereinafter referred to as "atmospheric-air radiating cycle circuit", and the refrigeration cycle implemented by this circuit will be referred to as "atmospheric-air radiating cycle") can be constructed.

The atmospheric-air radiation cycle circuit is constructed so that refrigerant which is sucked into the first-stage compressing element of the second compressor 131 and compressed is discharged from the first-stage discharge port, successively flows through the intermediate pressure discharge pipe 36, the change-over valve 76, the intermediate cooler 67, the change-over valve 77, the intermediate pressure suction pipe 37 and the second-stage suction port of the second compressor 131 in this order, is compressed by the second-stage compressing element, successively flows through the high-pressure discharge pipe 35, the branch point 71, the change-over valve 73, the third radiator 62, the high-pressure side flow path of the internal heat exchanger 64, the expansion valve 63, the joint point 72, the second refrigeration cycle circuit side flow path 5b of the supercooler 5, the low-pressure side flow path of the internal heat exchanger 64 and the accumulator 38 in this order, and then returns to the first-stage suction port of the second compressor 131. At this time, the change-over valves 73, 76 and 77 are opened, and the change-over valves 74, 75 and 78 are closed.

In the refrigerating apparatus of this embodiment, carbon dioxide refrigerant is hermetically filled as refrigerant of the first refrigeration cycle circuit 192 as in the case of the refrigerating apparatus according to the first embodiment. In the refrigeration cycle using carbon dioxide refrigerant, the high-pressure side of the refrigeration cycle implements the transcritical cycle which exceeds the critical pressure of the refrigerant, and thus there is an advantage that water can be heated to a high temperature with high efficiency. Other types of refrigerant may be adopted.

The second compressor 131 is a rotary two-stage compression type compressor as in the case of the first embodiment. A different point resides in that the second compressor 131 is provided with a first-stage discharge port for discharging refrigerant after the refrigerant is compressed by the first-stage compressing element, and a suction port for the second-stage compressing element. Accordingly, the intermediate cooler 67 can be connected to the second compressor 131, so that the cooling efficiency can be enhanced. Since the intermediate cooler 67 is not an indispensable element, it is possible to eliminate the intermediate cooler 67. In this case, as the second compressor 131 may be adopted the same second compressor 31 having no first-stage discharge port as the first embodiment, a scroll type or rotary type one-stage compression type, or other types of compressors.

As in the case of the first embodiment, the second compressor 131 is driven by an inverter, and the operational rotational number thereof may be changed. Accordingly, the supercooling capacity and the hot water supply capacity can be changed in accordance with the refrigeration load, and high-efficient capacity (power) control can be performed.

The intermediate cooler 67 is a heat exchanger for performing the heat-exchange between the refrigerant discharged from the first-stage compressing element of the second compressor 131 and the atmospheric air to cool the refrigerant. Accordingly, the compression capacity of the second compressor 131 can be reduced and the cooling efficiency can be enhanced. The intermediate cooler 67 is a fin-and-tube type heat exchanger, and a fan 62f of the third radiator 62 described later is used as a fan for supplying air to be heat-exchanged with refrigerant. The intermediate cooler 67 and the third radiator 62 shares a cooling fin, and are constructed integrally with each other.

The third radiator 62 is a heat-exchanger for performing the heat-exchange between the refrigerant discharged from the second-stage compressing element of the second compressor 131 and the atmospheric air to cool the refrigerant. The third radiator 62 is a fin-and-tube type heat exchanger, and has a fan 62f for supplying air to be heat-exchanged with refrigerant. The types of the heat exchangers of the intermediate cooler 67 and the third radiator 62 are not limited to this type.

The intermediate cooler 67 and the third radiator 62 may be unitized (constructed as a unit) while contained in the supercooling hot water supply device 130, or constructed as units different from the supercooling hot water supply device 130. When the intermediate cooler 67 and the third radiator 62 are constructed as units different from the supercooling hot water supply device 130, whereby a required number of heat exchanger units may be selected and installed in accordance with the cooling load of facilities to be installed.

The internal heat exchanger 64 is a heat exchanger for performing the heat-exchange between the high-pressure refrigerant discharged from the third radiator 62 and the low-pressure refrigerant flowing out from the second refrigeration cycle circuit side flow path 5b of the supercooler 5 to cool the high-pressure refrigerant and heat the low-pressure refrigerant. The internal heat exchanger 64 has a high-pressure side flow path and a low-pressure side flow path, and configured so that the refrigerant flowing through the high-pressure side flow path and the refrigerant flowing through the low-pressure side flow path can be heat-exchanged with each other and the refrigerant flowing directions thereof are opposite to each other. A plate type heat exchanger is used as the internal heat exchanger 64 according to this embodiment, however, other types of heat exchangers such as a double-tube type heat exchanger, a tube contact type heat exchanger, etc. may be adopted.

The expansion valve 63 as the third pressure-reducing device subjects high-pressure refrigerant to throttle expansion so as to set the high-pressure refrigerant to a low-pressure state. The expansion valve 63 is an electrically-operated expansion valve, and the opening degree thereof is controlled by the controller 96 so that the temperature of refrigerant discharged from the second compressor 131 which is detected by the discharge refrigerant temperature sensor T3 is equal to a predetermined value, whereby the supercooling of the first refrigeration cycle can be performed with high efficiency. A temperature type expansion valve, a constant-pressure expansion valve, a capillary tube or other types of throttle devices can be adopted as the expansion valve 63.

The second radiator 32, the expansion valve 33, the supercooler 5 and the accumulator 38 constituting the second refrigeration cycle circuit 192 according to this embodiment are the same as the refrigerating apparatus according to the first embodiment, and thus the detailed description thereof is omitted.

Next, the operation of the refrigerating apparatus according to the second embodiment will be described.

The refrigerating apparatus according to this embodiment determines whether it is necessary to boil up hot-water supply water or not, and switches the refrigerant flow path of the second refrigeration cycle circuit 192 on the basis of the determination result. The determination as to whether it is necessary to boil up the hot-water supply water or not is performed by determining the amount of hot water in the hot water supply tank 51 from the temperature of hot water in the hot water supply tank 51 detected by the temperature sensor T9 provided to the hot water supply tank 51 under the control of the hot water stock device 50. That is, the controller 98 determines that it is necessary to warm the hot-water supply water when the amount of hot water in the hot water supply tank 51 is equal to or smaller than a given hot-water amount, and also determines that it is unnecessary to warm the hot-water supply water when the amount of hot water in the hot water supply tank 51 is larger than the given hot-water amount. The given hot-water amount may be predetermined, or a using hot-water amount is measured and the given hot-water amount may be set by a learning function of the controller 98.

When it is necessary to boil up the hot-water supply water, the second refrigeration cycle circuit 192 constitutes a hot water supply cycle circuit, supercools the first refrigeration cycle and warms hot-water supply water. On the other hand, when it is unnecessary to boil up hot-water supply water, the second refrigeration cycle circuit 192 constitutes the atmospheric air heat radiation cycle circuit, and supercools the first refrigeration cycle by using atmospheric air as a heat radiating source.

In order to construct the hot water supply cycle circuit for supplying hot water, the change-over valves 73, 76 and 77 are closed, and the change-over valves 74, 75, 78 and the expansion valve 63 are opened, thereby constructing the hot water supply cycle circuit in which refrigerant successively flows through the second compressor 131, the change-over valve 74, the refrigerant flow path 32a of the second radiator 32, the expansion valve 33 as the second pressure-reducing device, the second refrigeration cycle circuit side flow path 5b of the supercooler 5, the low-pressure side flow path of the internal heat exchanger 64 and the accumulator 38 and then returns the suction port of the first-stage compressing element of the second compressor 131. When the change-over valve is operated, the controller 96 communicates with the controller 98 of the hot water stock device 50 and receives a signal representing whether it is necessary to boil up hot-water supply water or not.

Furthermore, the space of the third radiator 62 and the intermediate cooler 67 which are not used in the hot water supply cycle is connected to the low-pressure side circuit. Here, by properly opening/closing the change-over valve 73 and the expansion valve 63, the amount of refrigerant stocked in the space concerned can be adjusted. As a result, the amount of refrigerant circulating in the cycle can be properly maintained, and the cycle performance can be enhanced.

The operation of the hot water cycle for supercooling the first refrigeration cycle while warming hot-water supply water is the same as the refrigerating apparatus according to the first embodiment described above, and the action and effect are the same as the first embodiment. Therefore, the detailed description thereof is omitted. This embodiment has the internal heat exchanger 64, however, no refrigerant flows in the high-pressure side flow path of the internal heat exchanger 64. Therefore, the heat-exchange is not executed between refrigerants. Accordingly, the effect of the refrigeration cycle may be considered on the assumption that there is no internal heat exchanger 64.

In order to construct the atmospheric air radiation cycle circuit for radiating heat to the atmospheric air, the change-over valves 73, 76, 77 and the expansion valve 33 are opened, and the change-over valves 74, 75 and 78 are closed. Accordingly, the refrigerant which is sucked into the first-stage compressing element of the second compressor 131 and compressed is discharged from the first-stage discharge port, successively flows through the intermediate pressure discharge pipe 36, the change-over valve 76, then intermediate cooler 67, the change-over valve 77, the intermediate pressure suction pipe 37, and the second-stage suction port of the second compressor 131 in this order, and is compressed in the second-stage compressor element. Thereafter, the refrigerant successively flows through the high-pressure discharge pipe 35, the branch point 71, the change-over valve 73, the third radiator 62, the high-pressure side flow path of the internal heat exchanger 64, the expansion valve 63, the joint point 72, the second refrigeration cycle circuit side flow path 5b of the supercooler 5, the low-pressure side flow path of the internal heat exchanger 64 and the accumulator 38 and then returns to the first-stage suction port of the second compressor 131, thereby constructing the atmospheric air heat radiation circuit. As described above, the switching operation of the change-over valve is executed on the basis of a hot-water supply necessity signal from the controller 98 of the hot water stock device 50 by the controller 96 of the supercooling hot water supply device 130. The space of the refrigerant flow path 32a portion of the second radiator 32 which is not used in the atmospheric air heat radiation cycle is connected to the low-pressure side circuit. Here, by properly opening/closing the change-over valve 74 and the expansion valve 33, the amount of refrigerant stocked in the space concerned can be adjusted. As a result, the amount of refrigerant circulating in the cycle can be properly maintained, and the cycle performance can be enhanced.

In the atmospheric air heat radiation cycle, the low-temperature and low-pressure refrigerant vapor is sucked from the first-stage suction port of the second compressor 131, compressed in the first-stage compressing element of the second compressor 131 to become high-temperature and intermediate pressure refrigerant, and then discharged to the first-stage discharge pipe 36. The refrigerant concerned passes through the change-over valve 76, and enters the intermediate cooler 67, so that the refrigerant is heat-exchanged with the atmospheric air in the intermediate cooler 67 and cooled. The intermediate-pressure refrigerant is cooled in the intermediate cooler 67, whereby the temperature of refrigerant discharged from the second compressor 131 can be suppressed to a low value, and also the compression power of the compressor is reduced, thereby enhancing the cycle efficiency.

The refrigerant cooled in the intermediate cooler 67 is passed through the change-over valve 77, and sucked from the second-stage suction port of the second compressor 131. The refrigerant is compressed into a high-temperature and high-pressure refrigerant state by the second-stage compressing element of the second compressor 131, and discharged to the pipe 35. Carbon dioxide refrigerant is used as the refrigerant of the second refrigeration cycle circuit 192, and thus there is a case where the pressure of the refrigerant under this state exceeds the critical pressure. Thereafter, the refrigerant passes through the change-over valve 73 and flows into the third radiator 62 to be heat-exchanged with atmospheric air and cooled. The refrigerant cooled in the third radiator 62 becomes high-pressure and low-temperature refrigerant. When the refrigerant pressure in the heat exchanger exceeds the critical pressure, the refrigerant is not condensed, and the temperature thereof is reduced as it is cooled.

The refrigerant cooled in the third radiator 62 flows into the high-pressure side flow path of the internal heat exchanger 64, and in the high-pressure side flow path, the refrigerant concerned is heat-exchanged with low-pressure and low-temperature refrigerant flowing in the low-pressure side flow path. The low-pressure refrigerant is heated in the internal heat exchanger 64, so that a trouble caused by wet compression of the second compressor d131 can be prevented. Furthermore, by adopting the internal heat exchanger 64, the high-pressure refrigerant is cooled, and the specific enthalpy of the refrigerant at the entrance of the second refrigeration cycle circuit side flow path 5b of the supercooler 5 is reduced, so that the superheating degree of the refrigerant at the exit of the heat exchanger flow path 5b can be reduced. As a result, a large gas-liquid two-phase area having a high heat transfer coefficient can be secured in the second refrigeration cycle circuit side flow path 5b of the supercooler 5 acting as an evaporator, so that the heat transfer performance of the supercooler 5 can be enhanced and the cycle performance can be enhanced.

The refrigerant flowing out from the high-pressure side flow path of the internal heat exchanger 64 is subjected to throttle expansion (isenthalpic expansion) by the expansion valve 63, and flows into the second refrigeration cycle circuit side flow path 5b of the supercooler 5. The refrigerant flowing into the supercooler 5 is under the low-pressure gas-liquid two-phase state. In the second refrigeration cycle circuit side flow path 5b of the supercooler 5, the refrigerant is heat-exchanged with the refrigerant of the first flowing cycle flowing through the first refrigeration cycle circuit side flow path 5a to cool the refrigerant of the first refrigeration cycle is cooled, and the liquid-phase portion thereof is vaporized. The refrigerant of the first refrigeration cycle is supercooled by the vaporization action of the refrigerant of the second refrigeration cycle.

The low-pressure and low-temperature vaporized refrigerant flowing out from the second refrigeration cycle circuit side flow path 5b of the supercooler 5 flows into the low-pressure side flow path of the internal heat exchanger 64, and it is heat-exchanged with the high-pressure and low-temperature refrigerant flowing in the high-pressure side flow path and heated there. Then, the refrigerant concerned flows into the accumulator 38 to be perfectly subjected to gas-liquid separation, and the flows into the first-stage suction port of the second compressor 131 to be compressed again. The above operation is continuously executed, and the supercooling of the first refrigeration cycle by the second refrigeration cycle can be performed.

The rotational number of the second compressor 131 and the opening degree of the expansion valve 63 are controlled by the controller 96 provided to the supercooling hot water supply device 130. The rotational number of the second compressor 131 is adjusted so that the temperature of supercooled refrigerant of the first refrigeration cycle detected by the supercooling temperature sensor T4 provided at the first refrigeration cycle circuit side exit of the supercooler 5 is equal to a predetermined value. Accordingly, the proper supercooling degree corresponding to the cooling load can be implemented, and high-efficient cooling operation can be performed. Furthermore, the controller 96 of the supercooling hot water supply device 130 communicates with the controller 95 provided to the refrigeration unit 10, and controls the start/stop of the second compressor 131 interlockingly with the start/stop of the first compressor 1 of the first refrigeration cycle circuit 91, thereby preventing unnecessary supercooling operation when the first compressor 1 of the first refrigeration cycle circuit 91 is stopped.

The opening degree of the expansion valve 63 is adjusted so that the temperature of the discharge refrigerant detected by the discharge refrigerant temperature sensor T3 provided to the discharge pipe 35 is equal to a predetermined value. Accordingly, the suitable high-pressure side pressure in the transcritical refrigeration cycle can be maintained, and the high-efficient supercooling can be performed.

As described above, according to the refrigerating apparatus of this invention, the second refrigerating cycle circuit 192 is provided with the third radiator 62 disposed in parallel to the second radiator 32, and radiates heat from the refrigerant to atmospheric air in the third radiator 62. Therefore, the supercooling of the first refrigeration cycle circuit 91 can be performed by the second refrigeration cycle circuit 192 without heating hot-water supply water. Accordingly, even under the state that the residual amount of hot water of the hot water supply tank is sufficient, that is, even under the state that it is unnecessary to boil up hot-water supply water, the supercooling of the first refrigeration cycle is performed by the second refrigeration cycle which is higher in vaporization temperature and cooling efficient than the first refrigeration cycle, whereby the refrigeration capacity and the cooling efficiency can be enhanced.

Next, a refrigerating apparatus according to a third embodiment of the present invention will be described with reference to FIG. 3.

Figure 3:
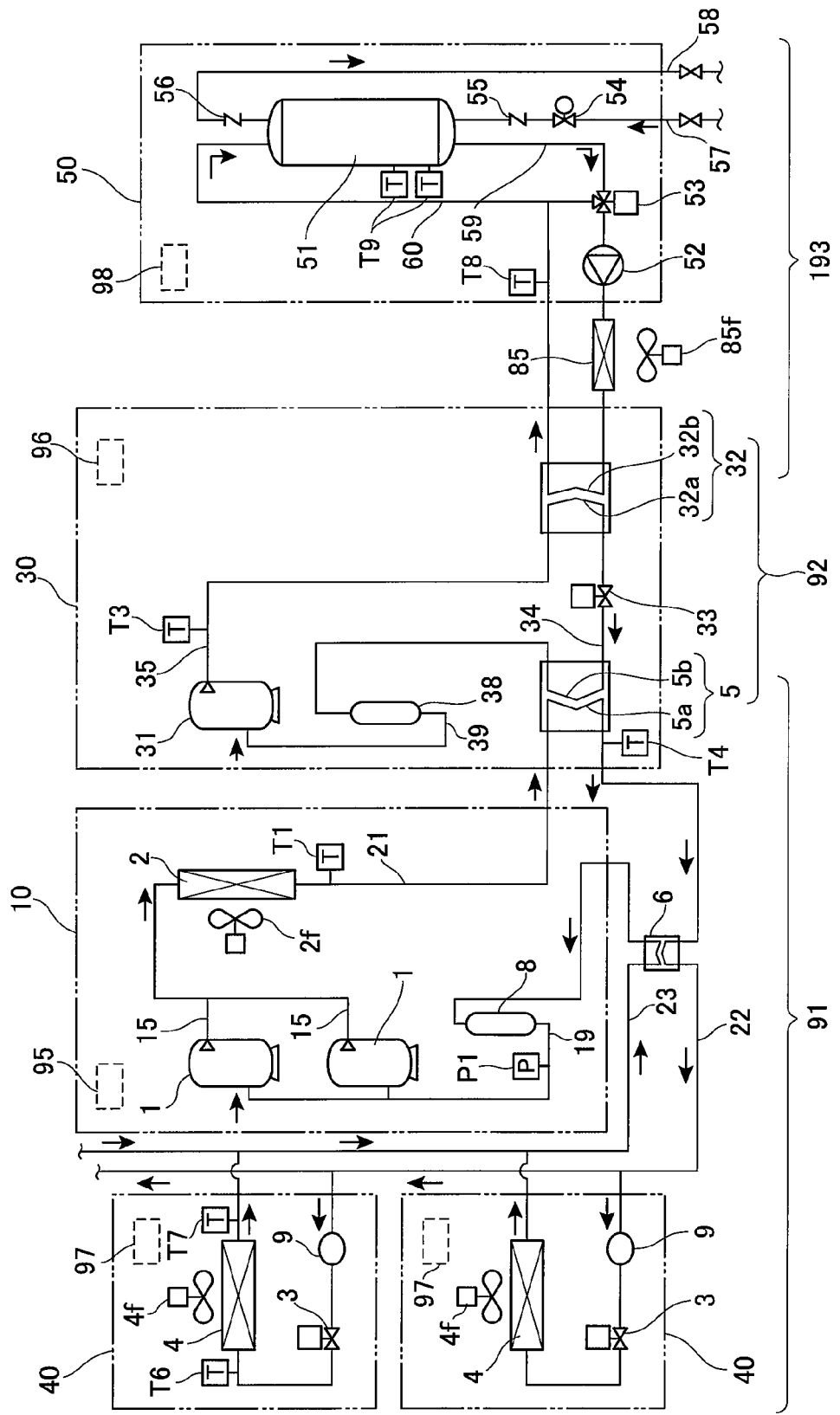
FIG. 3 is a diagram showing the construction of a refrigerating apparatus according to a third embodiment of the present invention.

FIG. 3 is a diagram showing the construction of the refrigerating apparatus according to the third embodiment.

In FIG. 3, constituent elements having the identical or similar action an effect to those of the refrigerating apparatus of the first embodiment are represented by the same reference numerals. In the refrigerating apparatus according to the third embodiment, a hot water supply circuit 193 is provided with a unit for radiating heat from hot-water supply water to atmospheric air. This point is different from the refrigerating apparatus according to the first embodiment. In the refrigerating apparatus according to the third embodiment, the supercooling operation using atmospheric air as a heat source (atmospheric air heat radiating operation) can be performed by a mechanism different from the refrigerating apparatus of the second embodiment. The first refrigeration cycle circuit 91, the second refrigeration cycle circuit 92, the refrigeration unit in which the equipment constituting these circuits is accommodated, the supercooling hot water supply device 30, the showcase 40 and the hot water stock device 50 have the same constructions, the same actions and effects as the refrigerating apparatus of the first embodiment, and thus the description thereof is omitted. Only the different point will be described in detail.

The refrigerating apparatus according to the third embodiment is characterized in that a water radiator 85 is provided to the hot water supply circuit 193. The water radiator 85 is a heat exchanger for performing the heat-exchange between hot-water supply water supplied to the second radiator 32 and atmospheric air to cool the hot-water supply water, and it is provided to a water pipe through which the circulating pump 52 and the water flow path 32b of the second radiator 32 are connected to each other. The water radiator 85 is a fin-and-tube type heat exchanger, and has a fan 85f for supplying air to be heat-exchanged with water. The type of the heat exchanger is not limited to the above type.

By providing the water radiator 85, the hot water supply circuit 193 forms a closed circuit (hereinafter referred to as "hot water supply circuit") in which hot-water supply water taken out from the lower portion of the hot water supply tank 51 successively flows through the three-way valve 53, the circulating pump 52, the water radiator 85, the water flow path 32b of the second radiator d32 and the pipe 60 in this order and then returns to the upper portion of the hot water supply tank 51. By switching the three-way valve 53, the hot water supply circuit 193 forms a closed circuit (atmospheric air heat radiating circuit) in which hot-water supply water pushed out by the circulating pump 52 successively flows through the water radiator 85, the water flow path 32b of the second radiator 32, the bypass pipe and the three-way valve 53 in this order and then returns to the circulating pump 52.

The water radiator 85 can be constructed as a unit different from the refrigeration unit 10, the supercooling hot water supply device 30, the showcase 140 and the hot water stock device 50. Accordingly, a required number of heat exchanger units can be installed in accordance with a cooling load and a hot water supply load of facilities in which the refrigerating apparatus is installed.

Next, the operation of the refrigerating apparatus according to the third embodiment will be described.

According to the refrigerating apparatus of this embodiment, it is determined by the same method as the refrigerating apparatus of the second embodiment whether it is necessary to boil up hot-water supply water or not. By switching the three-way valve 53, the hot-water supply circuit described above is constructed when it is necessary to warm the hot-water supply water, and the atmospheric air heat radiating circuit described above is constructed when it is unnecessary to boil up hot-water supply water. Furthermore, when it is necessary to warm hot-water supply water, the fan 85f of the water radiator 85 is stopped. On the other hand, when it is unnecessary to warm the hot-water supply water and also it is necessary to supercool the first refrigeration cycle, the fan 85f is operated. These control is executed by the controller 96 of the supercooling hot water supply device 30 and the controller 98 of the hot water stock device 50.

When it is necessary to boil up the hot-water supply water, the fan 85f is stopped as described above, and thus no heat-exchange is executed between hot-water supply water and atmospheric air in the water radiator 85. The hot water supply circuit 193 forms the hot water supply circuit, and thus a hot water supply operation of stocking, into the hot water supply tank 51, hot-water supply water warmed by refrigerant of the second refrigeration cycle circuit 92 in the second radiator 32 is executed. In this case, the operation of the refrigerating apparatus is the same as the refrigerating apparatus according to the first embodiment.

When it is unnecessary to heat the hot-water supply water and also it is necessary to supercool the first refrigeration cycle, the atmospheric air heat radiating circuit is formed, and the fan 85f is operated as described above. Accordingly, the hot-water supply water which absorbs heat from the refrigerant and increases in temperature in the second radiator 32 does not return to the hot water supply tank 51, and flows through the three-way valve 53 and the circulating pump 52 into the water radiator 85. In the water radiator 85, high-temperature hot-water supply water is heat-exchanged with atmospheric air supplied by the fan 85f and cooled. The hot-water supply water which is cooled and thus reduced in temperature in the water radiator 85 flows into the water flow path 32b of the second radiator 32, and it is heat-exchanged with refrigerant of the second refrigeration cycle which flows through the refrigerant flow path 32a, whereby the refrigerant of the second refrigeration cycle can be cooled.

When the atmospheric heat radiating operation is executed, the temperature of hot-water supply water boiled up in the second radiator d32 (detected by the temperature sensor T8)

may be lower than a case where hot water supply is necessary. Furthermore, the temperature of the refrigerant discharged from the compressor of the second refrigeration cycle circuit 92 (detected by the temperature sensor T3) may be set to a low value. Accordingly, the supercooling efficiency of the second refrigeration cycle can be enhanced.

In a case where the method of switching the three-way valve 53 to form the atmospheric air heat radiating circuit when the boil-up of the hot-water supply water is unnecessary is adopted, the water radiator 85 may be provided to the high-temperature pipe 60 at the exit side of the second radiator 32.

Furthermore, as a simpler method, the three-way valve 53 is not switched even under atmospheric air heat radiating operation, and the same circuit as the hot water supply circuit may be constructed. The fan 85f of the water radiator 85 may be operated at the stage that hot water is filled in the hot water supply tank 51 and high-temperature hot water flows out from the low-temperature pipe 59. The determination as to the start/stop of the fan 85f may be performed on the basis of the temperature detected by the temperature sensor T9 provided to the hot water supply tank 51 as described above, or on the basis of the temperature detected by a temperature sensor (not shown) which is separately provided to a pipe at the entrance side of the water radiator 85. When the atmospheric air heat radiating operation is executed according to the method as described above, the circulation amount of hot-water supply water is required to be controlled so that the hot water temperature at the exit of the second radiator 32 detected by the temperature sensor T8 is equal to a predetermined temperature for hot water supply, and the temperature of the refrigerant discharged from the compressor of the second refrigeration cycle circuit 92 is also required to be set to a high temperature as in the case of the hot water supply operation.

As described above, the refrigerating apparatus according to this embodiment is further provided with the water radiator 85 which is connected to the water pipe between the second radiator 32 of the second refrigeration cycle circuit 92 and the hot water supply tank 51 of the second radiator 32, and heat can be radiated from hot-water supply water to atmospheric air in the water radiator 85. Therefore, the supercooling of the first refrigeration cycle can be performed by the second refrigeration cycle circuit 92 without increasing hot water. Accordingly, even under the state that the hot water supply tank 51 is filled with hot water, that is, even under the state that it is unnecessary to supply hot water, the first refrigeration cycle is supercooled by the second refrigeration cycle which is higher in vaporization temperature and cooling efficiency than the first refrigeration cycle, whereby the refrigeration capacity and the cooling efficiency can be enhanced.

Next, a refrigerating apparatus according to a fourth embodiment according to the present invention will be described with reference to FIG. 4.

Figure 4:
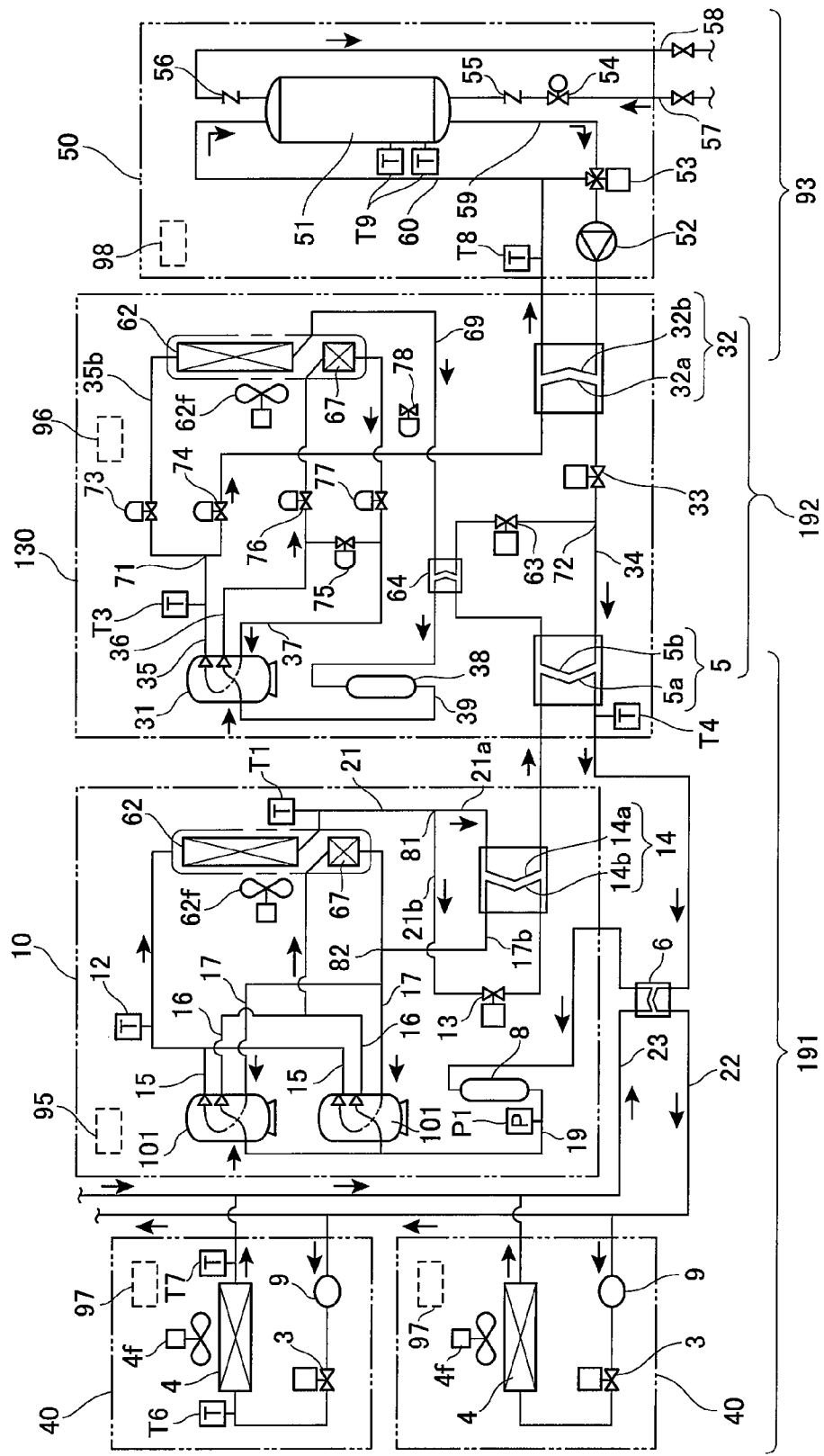
FIG. 4 is a diagram showing the construction of a refrigerating apparatus according to a fourth embodiment of the present invention.

FIG. 4 is a diagram showing the construction of the refrigerating apparatus according to the fourth embodiment.

In FIG. 4, constituent elements having the identical or similar action and effect to the refrigerating apparatuses of the first to third embodiments are represented by the same reference numerals. In the refrigerating apparatus according to the fourth embodiment, a first refrigeration cycle circuit 191 is provided with an intermediate cooler 7 and an subsidiary heat exchanger 14, and this point is different from the refrigerating apparatuses according to the first to third embodiments.

The refrigerating apparatus according to this embodiment can further enhance the cooling efficiency of the first refrigeration cycle, and particularly has a greater effect in the transcritical cycle in which the pressure of the refrigerant exceeds the critical pressure at a high-pressure side. The second refrigeration cycle circuit 92 or 192, the hot water supply circuit 93 or 193 and the supercooling hot water supply device 30 or 130 in which the equipment constituting these circuits are mounted, the showcase 40 and the hot water stock device 50 have the same constructions, actions and effects as the refrigerating apparatuses according to the first to third embodiments, and thus the description thereof is omitted. Only the different point from the first to third embodiments will be described in detail.

The first refrigeration cycle circuit 191 according to the fourth embodiment has a refrigerant circuit in which refrigerant discharged from the intermediate pressure portion of the first compressor 101, that is, the first-stage compressing element successively flows through a pipe 16, an intermediate cooler 7 and a pipe 17 in this order and then returns to the suction port of the second-stage compressing element of the first compressor 101.

Furthermore, the first refrigeration cycle circuit 191 according to this embodiment has a refrigerant circuit as a subsidiary refrigerant circuit in which refrigerant is branched from a branch portion 81 provided to the exit-side pipe 21 of the first radiator 2, successively flows through a pipe 21b, a subsidiary expansion valve 13 as a subsidiary throttle unit, a subsidiary circuit side flow path 14b of a subsidiary heat exchanger 14 and a pipe 17b (as a subsidiary refrigerant circuit) and then reaches a joint point 82 provided to the pipe 17. A main circuit side flow path 14a of the subsidiary heat exchanger 14 is provided to a lower side pipe 21a of the branch point 81 provided to the exit-side pipe of the first radiator 2.

By the added refrigerant circuit described above, the first refrigeration cycle circuit 191 of the refrigerating apparatus according to this embodiment constructs a refrigerant circuit as a main refrigerant circuit in which refrigerant which is sucked into the first-stage compressing element of the first compressor 101 and compressed is discharged from the first-stage discharge port, successively flows through the intermediate discharge pipe 16, the intermediate cooler 7, the pipe 17 and the second-stage suction port of the first compressor 101 in this order, is compressed in the second-stage compressing element, successively flows through the high-pressure discharge pipe 15, the first radiator 2, the branch point 81, the pipe 21a, the main circuit side flow path 14a of the subsidiary heat exchanger 14, the first refrigeration cycle circuit side flow path 5a of the supercooler 5, the high-pressure side flow path of the internal heat exchanger 6, the strainer 9, the expansion valve 3 as the first pressure-reducing device, the evaporator 4, the low-pressure side flow path of the internal heat exchanger 6 and the accumulator 8 in this order, and then returns to the first-stage suction port of the first compressor 101. Furthermore, the first refrigeration cycle circuit 191 has a refrigerant circuit as a subsidiary refrigerant circuit in which refrigerant branched from the branch point 81 successively flows through the pipe 21b, the subsidiary expansion valve 13 as the subsidiary throttle unit, the subsidiary circuit side flow path 14b of the subsidiary heat exchanger 14 and the pipe 17b in this order and reaches the joint point 82.

Carbon dioxide (R744) is used as the refrigerant of the first refrigeration cycle according to this embodiment, however, other refrigerant such as fluorocarbon type refrigerant such as R404A, R407C, R134a or the like, natural refrigerant such as ammonium (R717) or the like may be adopted. With respect to carbon dioxide refrigerant whose pressure exceeds the critical pressure at the high-pressure side of the refrigeration cycle, the refrigeration capacity and the refrigeration efficiency are remarkably reduced due to increase to the outside air temperature, and this embodiment has a greater effect of improving the cooling capacity (performance).

The first compressor 101 is a rotary type two-stage compressor as in the case of the first embodiment. The different point resides in that the first compressor 101 is provided with a first-stage discharge port for discharging refrigerant after the refrigerant is compressed by the first-stage compressing element and a suction port for the second-stage compressing element. Accordingly, the intermediate cooler 7 can be connected to the first compressor 101, so that the cooling efficiency can be enhanced. The intermediate cooler is not an indispensable constituent element, and thus the intermediate cooler 7 may be omitted. In this case, the first compressor 101 may be the same first compressor 1 having no first-stage discharge port as the first embodiment, or other types of compressors such as a scroll type or rotary type first-stage compressor, etc. may be adopted.

Furthermore, as in the case of the first embodiment, the first compressor 101 is driven by an inverter, and the operating rotational number may be changed, whereby the cooling capacity can be changed in accordance with the refrigeration load, and high-efficient capacity control can be performed. Furthermore, the second-stage discharge pipe 15 of the first compressor 101 is provided with a discharge refrigerant temperature sensor T2 for detecting the temperature of refrigerant discharged from the first compressor 101.

The intermediate cooler 7 is a heat exchanger for performing the heat-exchange between the refrigerant discharged from the first-stage compressing element of the first compressor 101 with atmospheric air to cool the refrigerant. Accordingly, the compression power of the first compressor 101 can be reduced and the cooling efficiency can be enhanced. The intermediate cooler 7 is a fin-and-tube type heat exchanger, and the fan 2f of the first radiator 2 is used as a fan for supplying air to be heat-exchanged with the refrigerant. The intermediate cooler and the first radiator 2 shares the cooling fin, and they are integrally constructed.

The expansion valve 13 as the subsidiary throttle unit subjects the high-pressure refrigerant to throttle expansion so that the high-pressure refrigerant is set to an intermediate-pressure state. The expansion valve 13 is an electrically-operated expansion valve, and the opening degree thereof is controlled by the controller 95 so that the discharge refrigerant temperature of the first compressor 101 detected by the discharge refrigerant temperature sensor T2 is equal to a predetermined value. Accordingly, the refrigerant flow rate of the subsidiary refrigerant circuit is suitably adjusted, and the high-efficient cooling can be performed. Other throttle devices such as a temperature type expansion valve, a constant-pressure expansion valve, a capillary tube, etc. may be adopted as the expansion valve 13. Furthermore, in place of the refrigerant temperature detected by the discharge refrigerant temperature sensor T2, the opening degree of the subsidiary expansion valve 13 may be controlled on the basis of the refrigerant temperature at the exit of the main circuit side flow path 14a of the subsidiary heat exchanger 14 which is detected by a separately provided temperature sensor, the refrigerant temperature at the entrance of the subsidiary circuit side flow path 14b, the refrigerant temperature at the exit of the subsidiary circuit side flow path 14b, the refrigerant temperature at the second-stage suction port of the first compressor 101, the intermediate pressure of the first compressor 101 (the pressure of the pipe 16, 17, 17b portion or the like) or the like.

The subsidiary heat exchanger 14 is a heat exchanger for performing the heat-exchange between the refrigerant of the main circuit side which flows out from the first radiator 2 and flows into the supercooler 5 and the subsidiary circuit side refrigerant which is branched at the branch point 81 and then reduced in pressure in the subsidiary expansion valve 13, thereby cooling the main circuit side refrigerant and heating the subsidiary circuit side refrigerant. The subsidiary heat exchanger 14 has the main circuit side flow path 14a and the auxiliary circuit side flow path 14b which are configured so that the refrigerants flowing through the flow paths are heat-exchangeable with each other and the refrigerant flowing directions thereof are opposite to each other. A plate type heat exchanger is used as the subsidiary heat exchanger 14 according to this embodiment, however, various other types of heat exchangers such as a double-tube type, a tube contact type, etc. may be adopted as the subsidiary heat exchanger 14.

The first radiator 2, the supercooler 5, the internal heat exchanger 6, the strainer 9, the expansion valve 3 as the first pressure-reducing device, the evaporator 4 and the accumulator 8 constituting the first refrigeration cycle circuit 191 of this embodiment are the same as the refrigerating apparatus according to the first embodiment, and thus the detailed description thereof is omitted.

Next, the operation of the refrigerating apparatus according to the fourth embodiment will be described.

Figure 5:
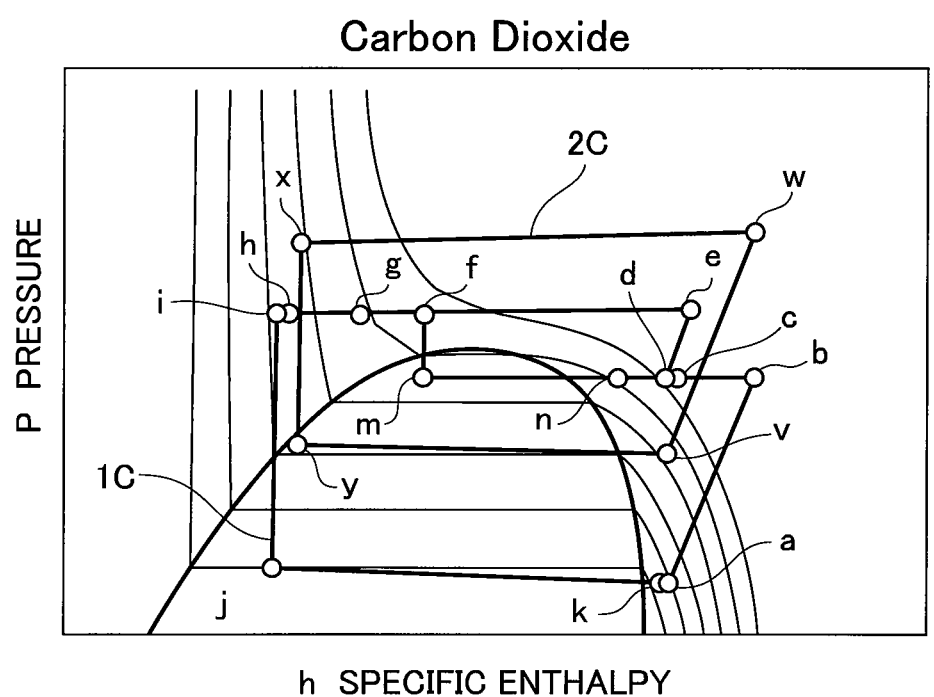
FIG. 5 is a pressure-enthalpy diagram showing a refrigeration cycle according to the present invention.

FIG. 5 is a pressure-specific enthalpy diagram showing the refrigerant cycle of the refrigerating apparatus according to the fourth embodiment.

In FIG. 5, reference numeral 1C represents a first refrigeration cycle, and reference numeral 2C represents a second refrigeration cycle. In the first refrigeration cycle circuit 191, low-temperature refrigerant vapor represented by a state a in FIG. 5 is sucked from the first-stage suction port of the first compressor 101, compressed by the first-stage compressing element and then discharged as high-temperature and intermediate-pressure refrigerant vapor. The refrigerant under this state is represented by a state b in FIG. 5. This refrigerant enters the intermediate cooler 7 and it is heat-exchanged with atmospheric air and cooled, so that the refrigerant is reduced in temperature and falls into a state c. As described above, the refrigerant discharged from the first-stage compressing element of the first compressor 101 is cooled by the intermediate cooler 7, so that the temperature of the refrigerant discharged from the second-stage compressing element of the first compressor 101 can be suppressed to a low value and a trouble caused by abnormally high temperature of the compressor or the like can be prevented. By adopting the intermediate cooler 7, the compression power of the first compressor 101 can be reduced, and thus the cooling efficiency can be enhanced.

At the joint point 82, the refrigerant represented by the state c which is discharged from the intermediate cooler 7 joins low-temperature refrigerant represented by a state n flowing from the subsidiary circuit side (the pipe 17b side). The refrigerant after the joint is represented by a state d. The refrigerant after the joint is sucked from the second-stage suction port of the first compressor 110, compressed by the second-stage compressing element of the first compressor 101, and discharged as high-temperature and high-pressure refrigerant (state e). In this embodiment, carbon dioxide is used as the refrigerant of the first refrigeration cycle, and thus the pressure of the refrigerant discharged from the first compressor 101 may exceed the critical pressure as shown by the state e of FIG. 5.

The refrigerant discharged from the first compressor 101 flows into the first radiator 2, and it is heat-exchanged with atmospheric air and cooled. As shown in FIG. 5, when the pressure of the refrigerant in the first radiator 2 exceeds the critical pressure, the refrigerant cooled there is not condensed, and the temperature thereof is reduced as it is cooled. The refrigerant cooled by the first radiator 2 is represented by a state f.

The refrigerant flowing out from the first radiator 2 is branched at the branch point 81. After the main circuit side refrigerant passes through the branch point 81, the refrigerant concerned flows through the pipe 21a and then flows to the main circuit side flow path 14a of the subsidiary heat exchanger 14. Furthermore, the subsidiary circuit side refrigerant branched at the branch point 81 flows the pipe 21b, and passes through the subsidiary expansion valve 13 to be subjected to throttle expansion (isenthalpic expansion), so that the pressure of the refrigerant is reduced to an intermediate pressure which is higher than the first-stage suction pressure of the compressor 101 and lower than the second-stage discharge output. The refrigerant which has been reduced in pressure in the subsidiary expansion valve 13 is represented by a state m, and when the pressure is not more than the critical pressure, the refrigerant concerned is set to a gas-liquid two-phase state. The refrigerant reduced in pressure in the subsidiary expansion valve 13 flows into the subsidiary circuit side flow path 14b of the subsidiary heat exchanger 14.

In the subsidiary heat exchanger 14, the refrigerant flowing through the main circuit side flow path 14a and the refrigerant flowing through the subsidiary circuit side flow path 14b are heat-exchanged with each other, so that the main circuit side refrigerant is cooled and thus changed from the state f to a state g while the subsidiary circuit side refrigerant is heated and changed from the state m to a state n. Accordingly, on the basis of the balance of the exchange heat quantity, the value which is obtained by multiplying the flow rate of the subsidiary circuit side refrigerant by the specific enthalpy difference between the state f and the state g is equal to the value which is obtained by multiplying the flow rate of the subsidiary circuit side refrigerant by the specific enthalpy difference between the state m and the state n. The main circuit side refrigerant is cooled in the subsidiary heat exchanger 14, whereby the refrigeration effect in the evaporator 4 is enhanced by the amount corresponding to the specific enthalpy difference between the state f and the state g.

At the joint point 82, the subsidiary circuit side refrigerant under the state n after heat-exchanged in the subsidiary heat exchanger 14 joins the refrigerant under the state c after cooled in the intermediate cooler 7 as described above, whereby the joint refrigerant is set to a state d. Thereafter, the refrigerant concerned is sucked into the second-stage suction port of the first compressor 101. During a process in which the intermediate-pressure refrigerant flowing through the subsidiary circuit is compressed, the refrigerant concerned is returned to the second-stage suction portion of the second-stage compressor. Therefore, the compression power of the first-stage compressing element can be more greatly reduced as compared with the case where the refrigerant concerned is returned to the first-stage suction portion. As a result, the refrigeration coefficient of the refrigeration cycle can be enhanced.

The main circuit side refrigerant of the state g after cooled in the subsidiary heat exchanger 14 flows into the first refrigeration cycle circuit side flow path 5a of the supercooler 5, and supercooled there by the vaporization action of the refrigerant of the second refrigerant cycle flowing through the second refrigeration cycle circuit side flow path 5b. The refrigerant under this state is represented by a state h. Accordingly, the specific enthalpy of the refrigerant is further reduced, and as compared with the case where the refrigerant concerned is not supercooled in the supercooler 5, the refrigeration effect is enhanced by the amount corresponding to the specific enthalpy difference between the state g and the state h.

The high-pressure and low-temperature liquid refrigerant under the state h which flows out from the supercooler 5 flows through the high-voltage side flow path of the internal heat exchanger 6, and it is heat-exchanged with the low-pressure and low-temperature refrigerant flowing through the low-pressure side flow path and thus cooled. That is, the refrigerant at the main circuit high-voltage side changes from the state h to a state i, and also the refrigerant at the main circuit low-pressure side changes from the state k to the state a. Since the high-pressure refrigerant is cooled by the internal heat exchanger 6, occurrence of flash gas in the refrigerant going pipe 22 can be prevented, and the low-pressure refrigerant is heated, so that an effect of preventing wet compression of the first compressor 101 can be obtained. By adopting the internal heat exchanger 6, a large two-phase area having a high heat transfer coefficient can be secured in the evaporator 4, so that the heat transfer performance of the evaporator 4 can be enhanced and the cycle performance can be also enhanced.

The refrigerant flowing out from the high-pressure side flow path of the internal heat exchanger 6 flows through the refrigerant going pipe 22, and passes through the strainer 9. Thereafter, the refrigerant is subjected to throttle expansion (isentropic expansion) in the expansion valve 3, and then flows into the evaporator 4. The refrigerant flowing into the evaporator 4 is represented by a state j, and it is under a low-pressure gas-liquid two-phase state. In the evaporator 4, the refrigerant is heat-exchanged with cool target air supplied by the fan 4f to cool the air, and the liquid-phase portion of the refrigerant is vaporized. At the exit of the evaporator 4, the refrigerant is slightly-superheated vapor, and it is represented by the state k.

The refrigerant flowing out from the evaporator passes through the refrigerant return pipe 23 and flows into the low-pressure side flow path of the internal heat exchanger 6. In the internal heat exchanger 6, the refrigerant concerned is heat-exchanged with high-pressure refrigerant flowing through the high-pressure side flow path and heated. The refrigerant under this state is represented by the state a. Then, the refrigerant passes through the accumulator 8 to be perfectly subjected to gas-liquid separation, and then the refrigerant flows into the first-stage suction port of the first compressor 101 to be compressed. The first refrigeration cycle is continuously operated as described above, the refrigeration performance is exercised in the evaporator 4. The air cooled by the evaporator 4 is circulated in the cold storage space, thereby freezing and chilling cool target objects such as foods, etc.

As in the case of the refrigerating apparatus according to the first embodiment, the operation of the first compressor 101 is controlled on the basis of the low pressure detected by the pressure sensor P1 by the controller 95 contained in the refrigeration unit. Furthermore, with respect to the control of the expansion valve 3, as in the case of the refrigerating apparatus according to the first embodiment, the control is performed on the basis of the superheating degree of the evaporator 4 by the controller 97 of the showcase 40.

The opening degree of the subsidiary expansion valve 13 as a subsidiary throttle unit is controlled by the controller 95 so that the temperature of refrigerant discharged form the first compressor d101 detected by the discharge refrigerant temperature sensor T2 secured to the pipe 15 is equal to a predetermined value. That is, when the discharge refrigerant temperature is equal to or higher than a predetermined target value, the opening degree of the subsidiary expansion valve 13 is increased. When the discharge refrigerant temperature is lower than the predetermined value, the opening degree of the subsidiary expansion valve 13 is reduced. Accordingly, the flow rate of the refrigerant flowing through the subsidiary refrigerant circuit can be properly maintained, and the high-efficient cooling operation can be performed.

Here, when the opening degree of the subsidiary expansion valve 13 is large, the exchange heat quantity in the subsidiary heat exchanger 14 is increased, the temperature of the main circuit refrigerant after cooled in the subsidiary heat exchanger 14 is lowered, and the specific enthalpy is reduced. That is, the state g is shifted to the left side on the pressure-specific enthalpy diagram. Conversely, when the opening degree of the subsidiary expansion valve 13 is small, the exchange heat quantity in the subsidiary heat exchanger 14 is reduced, the temperature of the main circuit refrigerant after cooled in the subsidiary heat exchanger 14 is increased, and the specific enthalpy is increased. That is, the state g is shifted to the right side on the pressure-specific enthalpy diagram. Therefore, when the hot-water supply water is required to be heated, the opening degree of the subsidiary expansion valve 13 is reduced, and when it is unnecessary to heat the hot-water supply water, the opening degree of the subsidiary expansion valve 13 is increased.

Specifically, the controller 95 sets a target discharge temperature value as a reference for controlling the subsidiary expansion valve 13 on the basis of a signal representing presence or absence of hot-water supply operation which is received through communications with the controller 98 of the hot water stock device 50 and the controller 96 of the supercooling hot water supply device 30 or d130. When the target discharge refrigerant temperature is set to a high value, the opening degree of the expansion valve 13 is controlled to decrease, and the flow rate of the subsidiary circuit refrigerant decreases. On the other hand, when the target discharge refrigerant temperature is set to a low value, the opening degree of the expansion valve 13 is controlled to increase, and the flow rate of the subsidiary circuit refrigerant increases.

Accordingly, when it is necessary to warm the hot-water supply water, the cooling amount of the main circuit refrigerant in the subsidiary heat exchanger 14 is reduced, the temperature of the refrigerant flowing out from the subsidiary heat exchanger 14 and flowing into the supercooler 5 can be increased, and the specific enthalpy can be increased, so that the exchange heat quantity in the supercooler 5 can be increased. As a result, the hot-water supply capacity and the heating efficiency in the second refrigeration cycle can be enhanced.

Conversely, when it is unnecessary to warm the hot-water supply water, the amount of refrigerant flowing through the subsidiary refrigerant circuit is increased so that the first refrigeration cycle has a suitable condition. Accordingly, the compression power of the first compressor 101 is reduced and the cooling amount of the main circuit refrigerant in the subsidiary heat exchanger 14 is increased, whereby the temperature of the refrigerant flowing into the supercooler 5 can be reduced and the specific enthalpy can be reduced. Therefore, the refrigeration capacity and the refrigeration efficiency of the first refrigeration cycle circuit 191 can be enhanced.

In FIG. 5, reference numeral 2C represents the second refrigeration cycle. The operation of the second refrigeration cycle circuit 92 or 192 is the same as the refrigerating apparatuses according to the first to third embodiments described above. A case where the hot-water supply water is heated will be described with reference to the pressure-specific enthalpy diagram of FIG. 5.

In the second refrigeration cycle circuit 192, low-temperature refrigerant vapor represented by a state v is sucked into the second compressor 131 and compressed into high-temperature and high-pressure refrigerant. When the hot-water supply cycle operation is executed, the refrigerant compressed in the first-stage compressing element of the second compressor 131 passes through the bypass valve 75 without being cooled in the intermediate cooler 67, and compressed into high-pressure refrigerant in the second-stage compressing element. The refrigerant under this state is the state w. Carbon Dioxide is used as the refrigerant in the second refrigeration cycle, and thus the pressure of the refrigerant under the state w exceeds the critical pressure. The refrigerant compressed in the second compressor 131 flows into the refrigerant flow path 32a of the second radiator 32, and it is heat-exchanged with hot-water supply water flowing through the water flow path 32b and cooled. The refrigerant in the second radiator 32 is not condensed because it is under the supercritical state, and the temperature thereof is lowered as it is heat-exchanged with water. That is, the second radiator 32 acts as a gas cooler. As described above, the refrigerant flow path 32a and the water flow path 32b of the second radiator 32 are constructed so that the refrigerant flowing directions thereof are opposite to each other, and thus the heat exchange between the supercritical refrigerant having a temperature gradient caused by the heat exchange and water can be efficiently performed. As compared with a case where fluorocarbon type refrigerant which is condensed under a fixed temperature is used in the high-pressure side heat exchanger, the refrigeration cycle of this invention using carbon dioxide refrigerant which establishes the transcritical cycle has an advantage that high-temperature hot water can be boiled up with high efficiency. The refrigerant cooled in the second radiator 32 is set to a state x.

The low-temperature supercritical refrigerant cooled by the second radiator 32 is throttled by the expansion valve 33 to be subjected to isenthalpic expansion, and it is set to a state y. Thereafter, the refrigerant flows into the second refrigeration cycle circuit side flow path 5b of the supercooler 5. The refrigerant under the state y which flows into the supercooler 5 is under the gas-liquid two-phase state. In the supercooler 5, the refrigerant of the second refrigeration cycle circuit 192 is heat-exchanged with the refrigerant of the first refrigeration cycle flowing through the first refrigeration cycle circuit side flow path 5a, and the liquid-phase portion thereof is vaporized and the refrigerant is under a state v. The refrigerant of the first refrigeration cycle is supercooled by the vaporization action of the refrigerant of the second refrigeration cycle. Accordingly, the value obtained by multiplying the refrigerant flow rate of the main refrigerant circuit of the first refrigeration cycle circuit 191 by the specific enthalpy difference between the state g and the state h is equal to the value obtained by multiplying the refrigerant flow rate of the second refrigeration cycle circuit 192 by the specific enthalpy difference between the state y and the state v.

The low-temperature vaporized refrigerant flowing out from the second refrigeration cycle circuit side flow path 5b of the supercooler 5 flows into the accumulator 8 without being heat-exchanged in the internal heat exchanger 64, and it is surely subjected to gas-liquid separation in the accumulator 38. Thereafter, the refrigerant flows into the suction port of the second compressor d131 to be compressed again. The above-described operation is continuously executed, whereby the first refrigeration cycle can be supercooled by the second refrigeration cycle and the hot-water supply water can be heated by using the waste heat of the supercooling of the first refrigeration cycle.

The rotational number of the second compressor 131 and the opening degree of the expansion valve 33 are controlled as in the case of the refrigerating apparatuses according to the first to third embodiments.

As described above, according to the refrigerating apparatus of the present invention, the refrigerant which flows out from the first radiator 2 and then flows into the supercooler 5, that is, the main circuit side refrigerant can be cooled by the refrigerant which flows out from the first radiator 2 of the first refrigeration cycle circuit 191 and then is branched and reduced in pressure, that is, the subsidiary circuit side refrigerant. Therefore, the refrigeration effect of the first refrigeration cycle can be enhanced, and the refrigeration capacity can be enhanced. Furthermore, the subsidiary circuit side refrigerant which has cooled the main circuit side refrigerant is sucked into some midpoint of the compression process at which the pressure of the refrigerant is higher than the suction pressure of the first compressor 101 and lower than the discharge pressure, and thus the compression power is reduced as compared with the case where all the refrigerant is compressed from the suction pressure to the discharge pressure without branching the refrigerant, so that the efficiency of the refrigeration cycle can be enhanced.

Furthermore, the opening degree of the subsidiary expansion valve 13 is controlled so as to be increased when the hot water amount stocked in the hot water supply tank 51 is large or reduced when the hot water stock amount is small. Therefore, high-efficient suitable operation can be performed in accordance with variation of the hot water supply load. That is, under the condition that the residual hot water amount in the hot water supply tank 51 is sufficient and it is unnecessary to warm the hot-water supply water, the refrigeration capacity and the refrigeration efficiency are enhanced by increasing the opening degree of the subsidiary expansion valve 13 and enhancing the effect of cooling the main circuit side refrigerant. On the other hand, when the hot water amount of the hot water supply tank 51 is small and it is necessary to warm the hot-water supply water, the opening degree of the subsidiary expansion valve 13 is reduced to suppress the effect of cooling the main circuit side refrigerant of the subsidiary heat exchanger, whereby the temperature of the refrigerant flowing into the supercooler and the specific enthalpy are kept to high values. Accordingly, the exchange heat quantity in the supercooler 5, that is, the absorption heat quantity of the second refrigeration cycle increases, and the vaporization temperature of the second refrigeration cycle rises. As a result, the heating capacity and the hot water supply efficiency of the second refrigeration cycle can be enhanced.

As described above, the refrigerating apparatuses according to the first to fourth embodiments are configured so that the controllers 95 to 98 are respectively contained in the refrigeration unit 10 or 110, the supercooling hot water supply device 30 or 130, the showcase 40 and the hot water stock device 50 which are respective unitized (i.e., constructed as units), and the operation of each refrigerating apparatus is controlled on the basis of the above construction. However, the construction of the controller is not limited to the above construction. For example, a central controller for collectively controlling the overall refrigerating apparatus of the present invention may be separately provided, and the refrigerating apparatus can be controlled by only the central controller or by cooperating the central controller with the controllers 95 to 98.

What is claimed is:

1. A refrigerating apparatus comprising:
a first refrigeration cycle circuit including a first compressor, a first radiator, a supercooler, a first pressure-reducing device and an evaporator that are successively connected to one another through a first refrigerant pipe, the first compressor, the first radiator, the supercooler, the first pressure-reducing device and the evaporator being successively connected in this order, the supercooler being disposed between the first radiator and the first pressure-reducing device;
a supercooling hot water supply device including a second compressor, a second radiator, a second pressure-reducing device and the supercooler that are successively connected to one another through a second refrigerant pipe, a first refrigerant of the first refrigeration cycle circuit being supercooled by vaporization action of the supercooling hot water supply device in the supercooler, and hot-water supply water being warmed by heat radiation action of a second refrigerant of the supercooling hot water supply device in the second radiator, the supercooler supercooling the first refrigerant of the first refrigeration cycle circuit;
a hot-water stock device having a hot water supply tank that is connected to the second radiator, the second radiator being connected to the supercooler;
a third radiator that is disposed in parallel to the second radiator through the second refrigerant pipe and radiates heat from the second refrigerant to atmospheric air;
a sensor for detecting an amount of hot water in the hot water supply tank; and
a controller, wherein the controller is configured to determine that it is necessary to warm the hot-water supply water when the amount of hot water in the hot water supply tank, which is detected by the sensor, is equal to or smaller than a predetermined hot-water amount and to determine that it is unnecessary to warm the hot-water supply water when the amount of hot water in the hot water supply tank is larger than the predetermined hot-water amount, and to execute heat radiation from the second refrigerant to the atmospheric air by the third radiator when it is unnecessary to warm the hot-water supply water, wherein the third radiator disposed in parallel to the second radiator that is connected to the supercooler,
the first compressor is a two-stage compression type compressor having a low-pressure side compressing element and a high-pressure side compressing element,
the refrigerating apparatus further comprises:
a subsidiary refrigerant circuit having a first branch portion provided to an exit-side pipe of the first radiator, a first subsidiary refrigerant pipe extending to the supercooler, and a second subsidiary refrigerant pipe extending to a suction port of the high-pressure side compressing element of the first compressor, the first and second subsidiary refrigerant pipes being connected to the first branch portion;
a subsidiary throttle unit which is provided on the second subsidiary refrigerant pipe and reduces the branched refrigerant to an intermediate pressure that is higher than the suction pressure of the first compressor and lower than a discharge pressure of the first compressor; and
a subsidiary heat exchanger for performing heat exchange between the branched refrigerant that is reduced in pressure by the subsidiary throttle unit and the refrigerant that is cooled by the first radiator and flows into the supercooler,
a third subsidiary refrigerant pipe is provided, which connects the low-pressure side compressing element and the high-pressure side compressing element and to which the second subsidiary refrigerant pipe is connected, and the controller is further configured to control opening degree of the subsidiary throttle unit to be increased when the amount of hot water in the hot water supply tank is larger than a predetermined amount, and reduced when the amount of the hot water is smaller than the predetermined amount.

2. The refrigerating apparatus according to claim 1, further comprising a water radiator connected to the second radiator through a water pipe, wherein heat is radiated from the hot-water supply water to atmospheric air in the water radiator.

3. The refrigerating apparatus according to claim 2, wherein the controller is further configured to execute heat radiation from the hot-water supply water to the atmospheric air when it is unnecessary to warm the hot-water supply water.

4. The refrigerating apparatus according to claim 1, wherein carbon dioxide is used as the second refrigerant filled in the supercooling hot water supply device, and the second radiator acts as a gas cooler.

5. The refrigerating apparatus according to claim 1, further comprising a detector configured to determine whether it is necessary to warm the hot-water supply water, wherein the controller is configured to execute the heat radiation from the second refrigerant to the atmospheric air by the third radiator when the detector determines that it is unnecessary to warm the hot-water supply water.

6. The refrigerating apparatus according to claim 5, wherein the detector is configured to detect a temperature of hot water stored in the hot water tank.

7. The refrigerating apparatus according to claim 1, wherein the second compressor, the second radiator, the second pressure-reducing device and the supercooler are successively connected in this order.

8. The refrigerating apparatus according to claim 1, wherein the second refrigeration cycle is provided with a second branch portion disposed on a discharge pipe of the second compressor, a fourth pipe connected to the second branch portion and extending to the second radiator and a fifth pipe connected to the second branch and bypassing the second radiator to extend to the supercooler, the fifth pipe is provided with the third radiator and a change-over valve.

9. The refrigerating apparatus according to claim 8, wherein the controller is configured to open the change-over valve when it is necessary to warm the hot-water supply water, or to open/close the change-over valve in accordance with an amount of the refrigerant of the supercooling hot water supply device second refrigeration cycle circuit.

10. The refrigerating apparatus according to claim 1, further comprising:

a refrigeration unit configured to house and unitize the first compressor and the first radiator;

a showcase configured to house and unitize the first pressure-reducing device and the evaporator; and the supercooling hot water supply device configured to house and unitize the second compressor, the second radiator, the second pressure-reducing device and the supercooler, wherein: the hot-water stock device is configured to house and unitize the hot water supply tank, and each of the refrigeration unit, the showcase, the supercooling hot water supply device and the hot-water stock device has pipe connection ports connected to each other respectively through the first refrigerant pipe, the second refrigerant pipe and a water pipe.

11. The refrigerating apparatus according to claim 1, wherein the third subsidiary refrigerant pipe is provided with an intermediate cooler and the second subsidiary refrigerant pipe is connected to the third subsidiary refrigerant pipe at a downstream side of the intermediate cooler.

12. The refrigerating apparatus according to claim 1, further comprising a temperature sensor provided to the hot water supply tank, wherein the controller is configured to determine the amount of hot water in the hot water supply tank from temperature of hot water in the hot water supply tank detected by the temperature sensor.

13. The refrigerating apparatus according to claim 1, wherein the showcase has cooling load that is larger than hot water supply load of the supercooling hot water supply device.

* * * * *